United States Patent
Foxworthy et al.

(10) Patent No.: US 8,274,981 B2
(45) Date of Patent: Sep. 25, 2012

(54) ACCELERATION THROUGH A NETWORK TUNNEL

(75) Inventors: Michael Foxworthy, Carlsbad, CA (US); Girish Chandran, Carlsbad, CA (US); Jason Lau, Lafayette, LA (US)

(73) Assignee: ViaSat, Inc., Carlsbad, CA (US)

( * ) Notice: Subject to any disclaimer, the term of this patent is extended or adjusted under 35 U.S.C. 154(b) by 252 days.

(21) Appl. No.: 12/761,996

(22) Filed: Apr. 16, 2010

(65) Prior Publication Data
US 2010/0265950 A1    Oct. 21, 2010

Related U.S. Application Data

(60) Provisional application No. 61/170,359, filed on Apr. 17, 2009, provisional application No. 61/316,791, filed on Mar. 23, 2010.

(51) Int. Cl.
*H04L 12/28* (2006.01)
*H04L 12/56* (2006.01)

(52) U.S. Cl. ........................ 370/392
(58) Field of Classification Search ............ None
See application file for complete search history.

(56) References Cited

U.S. PATENT DOCUMENTS

| | | | |
|---|---|---|---|
| 5,717,686 A | | 2/1998 | Schiavoni |
| 5,875,461 A | * | 2/1999 | Lindholm ............... 711/118 |
| 5,899,980 A | | 5/1999 | Wilf et al. |
| 5,940,394 A | * | 8/1999 | Killian ................... 370/393 |
| 6,052,560 A | | 4/2000 | Karabinis |
| 6,112,083 A | | 8/2000 | Sweet et al. |
| 6,240,072 B1 | | 5/2001 | Lo et al. |
| 6,249,677 B1 | | 6/2001 | Noerpel et al. |
| 6,934,262 B1 | | 8/2005 | Lau et al. |
| 7,017,042 B1 | | 3/2006 | Ziai et al. |
| 7,032,242 B1 | * | 4/2006 | Grabelsky et al. ........ 726/11 |
| 7,174,373 B1 | | 2/2007 | Lausier |

(Continued)

FOREIGN PATENT DOCUMENTS
GB    2374494 A    10/2002
(Continued)

OTHER PUBLICATIONS

Akyildiz, I. F. et al., "A survey of mobility management in next-generation all-IP-based wireless systems", IEEE Wireless Communications, IEEE Service Center, Piscataway, NJ, US, vol. 11, No. 4, Aug. 1, 2004, pp. 16-28.

(Continued)

*Primary Examiner* — Ayaz Sheikh
*Assistant Examiner* — Blanche Wong
(74) *Attorney, Agent, or Firm* — Holland & Hart LLP

(57) ABSTRACT

Methods and systems for implementing acceleration through a packet encapsulation protocol tunnel, are described. The method includes establishing a packet encapsulation protocol tunnel between a first network endpoint and a second network endpoint, sending packets with a packet encapsulation protocol tunnel header from the first network endpoint to the second network endpoint, and removing the packet encapsulation protocol tunnel headers from the packets. The method further includes storing the packet encapsulation protocol tunnel headers in a storage memory, performing acceleration on the packets, and retrieving the packet encapsulation protocol tunnel headers from the storage memory. Further, the method includes replacing the packet encapsulation protocol tunnel headers on the packets, and sending the packets with the packet encapsulation protocol tunnel headers through the packet encapsulation protocol tunnel to the second endpoint.

16 Claims, 14 Drawing Sheets

U.S. PATENT DOCUMENTS

| | | | |
|---|---|---|---|
| 7,289,440 | B1 | 10/2007 | Beshal et al. |
| 7,386,723 | B2* | 6/2008 | Seada et al. ............... 713/160 |
| 7,889,728 | B2 | 2/2011 | Arad et al. |
| 7,983,255 | B2 | 7/2011 | Kue |
| 7,992,174 | B2* | 8/2011 | Gin et al. .................. 725/63 |
| 8,019,841 | B2 | 9/2011 | Ellis et al. |
| 8,081,633 | B2 | 12/2011 | Veits |
| 2001/0026537 | A1 | 10/2001 | Massey |
| 2001/0033580 | A1 | 10/2001 | Dorsey et al. |
| 2001/0036161 | A1 | 11/2001 | Eidenschink et al. |
| 2003/0069926 | A1* | 4/2003 | Weaver et al. ............ 709/203 |
| 2004/0208121 | A1 | 10/2004 | Gin et al. |
| 2006/0047851 | A1 | 3/2006 | Voit et al. |
| 2006/0050736 | A1 | 3/2006 | Segel |
| 2006/0171369 | A1 | 8/2006 | Ostrup et al. |
| 2006/0262724 | A1 | 11/2006 | Friedman et al. |
| 2006/0274744 | A1 | 12/2006 | Nagai et al. |
| 2007/0076607 | A1 | 4/2007 | Voit et al. |
| 2007/0104096 | A1 | 5/2007 | Ribera |
| 2007/0147279 | A1 | 6/2007 | Smith et al. |
| 2007/0171918 | A1 | 7/2007 | Ota et al. |
| 2009/0067429 | A1 | 3/2009 | Nagai et al. |
| 2009/0092137 | A1 | 4/2009 | Haigh et al. |
| 2010/0260043 | A1 | 10/2010 | Kimmich et al. |
| 2010/0265876 | A1 | 10/2010 | Foxworthy et al. |
| 2010/0265877 | A1 | 10/2010 | Foxworthy et al. |
| 2010/0265878 | A1 | 10/2010 | Foxworthy et al. |
| 2010/0265879 | A1 | 10/2010 | Foxworthy et al. |
| 2010/0265941 | A1 | 10/2010 | Foxworthy et al. |
| 2010/0265957 | A1 | 10/2010 | Foxworthy et al. |

FOREIGN PATENT DOCUMENTS

| | | |
|---|---|---|
| WO | WO 03/021866 A2 | 3/2003 |
| WO | WO 2005/082040 A2 | 9/2005 |
| WO | WO 2007/103369 A2 | 9/2007 |
| WO | WO 2007/133786 A2 | 11/2007 |
| WO | WO-2010/121214 A | 10/2010 |
| WO | WO-2010/121215 A | 10/2010 |
| WO | WO-2010/121216 A | 10/2010 |
| WO | WO-2010/121217 A | 10/2010 |
| WO | WO-2010/121219 A | 10/2010 |
| WO | WO-2010/121220 A | 10/2010 |
| WO | WO-2010/121221 A | 10/2010 |

OTHER PUBLICATIONS

Akyildiz, I. F. et al., "Mobility Management in Current and Future Communications Networks", IEEE Network, IEEE Service Center, New York, NY USA, vol. 12, No. 4, Jul. 1, 1998, pp. 39-49.
Akyildiz, Ian F. et al., "Mobility Management in Next-Generation Wireless Systems", Proceedings of the IEEE, New York, US, vol. 87, No. 8, Aug. 1, 1999.
Held, G. Ed—Gilbert Held: "Virtual Private Networking, Introduction to Virtual Provate Networking", Dec. 31, 2004, Virtual Private Networking: A Construction Operation and Utilization Guide, Joh Wiley & Sons, GB, pp. 1-22.
Industrial Consortium for S-UMTS: "Final Report S-UMTS: Preparation of Next Generation Universal Mobile Satellite Telecommunications Systems", Nov. 29, 2000, pp. 1-35.
Kota, S. L. et al., "Integrated SATCOM/Terrestrial Networking: Protocols and DISN/Teleport Interface", Proceedings of the Military Communications Conference (MILCOM), San Diego, Nov. 6-8, 1995, New Your, IEEE, US, vol. 1, Nov. 6, 1995, pp. 453-459, XP 000580864.
Mancuso, V. et al., "Switched Ethernet Networking over LEO Satellite", Wireless Communication Systems, 2005, 2nd International Symposium on Siena, Italy, Sep. 5-9, 2005, Piscataway, NJ, USA, IEEE, pp. 883-887, Sections I. "Introduction" to IV. Impact on Network Services, pp. 883-886.
PCT International Search Report and Written Opinion mailed Aug. 2, 2010, International Application No. PCT/US2010/031510, 17 pages.
PCT International Search Report and Written Opinion mailed Jul. 23, 2010, International Application No. PCT/US2010/031509, 15 pages.
PCT International Search Report and Written Opinion mailed Jul. 27, 2010, International Application No. PCT/US2010/031514, 14 pages.
PCT International Search Report and Written Opinion mailed Jul. 29, 2010, International Application No. PCT/US2010/031508, 17 pages.
PCT International Search Report and Written Opinion mailed Nov. 23, 2010, International Application No. PCT/US2010/031513, 20 pages.
PCT International Search Report and Written Opinion mailed Sep. 20, 2010, International Application No. PCT/US2010/031515, 25 pages.
PCT International Search Report and Written Opinion mailed Sep. 3, 2010, International Application No. PCT/US2010/031511, 16 pages.
PCT Invitation to Pay Additional Fees mailed Jul. 29, 2010, International Application No. PCT/US2010/031515, 9 pages.
Shen Quingguo, "Handover in Packet-Domain UMTS", EE Times Design, Aug. 2, 2002, retrieved from the internet on Aug. 2, 2010 at: http://www.eetimes.com/design/communications-design/4018087/Handover-in-packet-Domain-UMTS, pp. 1-6.
Shneyderman, Alex: "Mobile VPNs for Next Generation GPRS and UMTS Networks", White Paper Lucent Technologies, Dec. 31, 2000, retrieved online on Aug. 5, 2010 at http://esoumoy.free.fr/telecom/tutorial/3G-VPN.pdf, 16 pgs.
Tissa Senevirathne Som Sikidar Neena Premmaraju (FORCE10): "Ethernet Over IP—A Layer 2 VPN Solution using Generic Routing Encapsulation (GRE); draft-tsenevir-l2vpn-gre-00.txt", IETF Standard-Working-Draft, Internet Engineering Task Force, IETF, CH, Jul. 1, 2001, XP015036263.
U.S. Appl. No. 12/761,834, filed Apr. 16, 2010, 40 pages.
U.S. Appl. No. 12/761,858, filed Apr. 16, 2010, 40 pages.
U.S. App. No. 12/761,882, filed Apr. 16, 2010, 41 pages.
U.S. Appl. No. 12/761,904, filed Apr. 16, 2010, 40 pages.
U.S. Appl. No. 12/761,941, filed Apr. 16, 2010, 36 pages.
U.S. Appl. No. 12/761,968, filed Apr. 16, 2010, 33 pages.
Non-final Office Action dated Mar. 6, 2012, Layer-2 Extension Services, U.S. Appl. No. 12/761,882, 23 pgs.
Non-final Office Action dated May 18, 2012, Layer-2 Connectivity from Switch to Access Node/Gateway, U.S. Appl. No. 12/761,834, 17 pgs.
Notice of Allowance and Examiner Initiated Interview Summary dated Jun. 21, 2012, Access Node/Gateway to Access Node/Gateway Layer-2 Connectivity (End-to-End), U.S. Appl. No. 12/761,858, 18 pgs.
Non-final Office Action dated Jun. 15, 2012, Mobility Across Satellite Beams Using L2 Connectivity, U.S. Appl. No. 12/761,904, 12 pgs.
Non-final Office Action dated Mar. 21, 2012, Core-based Satellite Network Architecture, U.S. Appl. No. 12/761,968, 17 pgs.
WIPO, PCT International Preliminary Report on Patentability dated Jul. 7, 2011, PCT/US2010/031509, 9 pgs.
WIPO, PCT International Preliminary Report on Patentability dated May 23, 2011, PCT/US2010/031514, 9 pgs.
WIPO, PCT International Preliminary Report on Patentability dated Jul. 1, 2011, PCT/US2010/031508, 11 pgs.
WIPO, PCT International Preliminary Report on Patentability dated Jul. 1, 2011, PCT/US2010/031510, 12 pgs.
WIPO, PCT International Preliminary Report on Patentability dated Aug. 2, 2011, PCT/US2010/031511, 12 pgs.
WIPO, PCT International Preliminary Report on Patentability dated Aug. 2, 2011, PCT/US2010/031515, 12 pgs.
WIPO, PCT Revised International Search Report and Written Opinion dated Jul. 1, 2011, PCT/US2010/031513, 17 pgs.
WIPO, PCT International Preliminary Report on Patentability dated Aug. 2, 2011, PCT/US2010/031513, 15 pgs.
Feltrin et al., "Design, Implementation and Performances of an Onboard Processor-based Satellite Network," Communications, 2004 IEEE International Conference on, vol. 6, No., pp. 3321-3325, Jun. 20-24, 2004.
LAN/MAN Standards Committee of the IEEE Computer Society, IEEE Standard for Local and Metropolitan Area Networks—Virtual Bridged Local Area Networks, IEEE Std 802.1QTM-2005, May 19, 2006, The Institute of Electrical and Electronics Engineers, Inc., USA, 303 pgs.

* cited by examiner

ACCELERATION THROUGH A NETWORK TUNNEL

PRIORITY CLAIM

This application claims priority to U.S. Provisional Application No. 61/170,359, entitled DISTRIBUTED BASE STATION SATELLITE TOPOLOGY, filed on Apr. 17, 2009, and also claims priority to U.S. Provisional Application No. 61/316,791, entitled ACCELERATION THROUGH A NETWORK TUNNEL, filed on Mar. 23, 2010, which are both incorporated by reference in their entirety for any and all purposes.

RELATED APPLICATIONS

This application is related to U.S. Provisional Application No. 61/254,551, entitled Layer-2 Connectivity From Switch to Access Node/Gateway, filed on Oct. 23, 2009, U.S. Provisional Application No. 61/254,553, entitled Access Node/Gateway to Access Node/Gateway Layer-2 Connectivity (End-to-End), filed on Oct. 23, 2009, U.S. Provisional Application No. 61/254,554, entitled Layer-2 Extension Services, filed on Oct. 23, 2009, U.S. Provisional Application No. 60/313,017, entitled Core-based Satellite Network Architecture, filed on Mar. 11, 2010, U.S. Provisional Application No. 60/316,782, entitled Multi-Satellite Architecture, filed Mar. 23, 2010 concurrently herewith, and U.S. Provisional Application No. 60/316,776, entitled Mobility Across Satellite Beams Using L2 Connectivity, filed Mar. 23, 2010, which are all incorporated by reference herewith in their entirety for any and all purposes.

FIELD OF THE INVENTION

The present invention relates, in general, to satellite networks, and more particularly, to acceleration through a network tunnel.

BACKGROUND OF THE INVENTION

A network tunnel encapsulates network traffic within a tunneling protocol. While encapsulated, acceleration techniques are unable to distinguish between packets, and therefore are unable to accelerate the traffic. Also, traffic shaping on packets within the tunnel is not possible. In addition, previous attempts to solve this problem have failed and, in particular, are unable to provide header preservation and account. Hence, improvements in the art are needed.

SUMMARY OF THE INVENTION

In one embodiment, a method of implementing acceleration through a packet encapsulation protocol tunnel, is described. The method includes establishing a packet encapsulation protocol tunnel between a first network endpoint and a second network endpoint, sending packets with a packet encapsulation protocol tunnel header from the first network endpoint to the second network endpoint, and removing the packet encapsulation protocol tunnel headers from the packets. The method further includes storing the packet encapsulation protocol tunnel headers in a storage memory, performing acceleration on the packets, and retrieving the packet encapsulation protocol tunnel headers from the storage memory. Further, the method includes replacing the packet encapsulation protocol tunnel headers on the packets, and sending the packets with the packet encapsulation protocol tunnel headers through the packet encapsulation protocol tunnel to the second endpoint.

In a further embodiment, a system for implementing acceleration through a packet encapsulation protocol tunnel, is described. The system includes a customer premises device (CPE) configured to transmit a packet with a network request. The packet includes a header and a destination. The system further includes a user terminal (UT) in communication with the CPE configured to receive the packet. Further, the system includes a satellite in communication with the UT configured to transmit the packet. The system also includes a satellite modem termination system (SMTS) in communication with the satellite. The SMTS is configured to receive the packet, establish a packet encapsulation protocol tunnel between the SMTS and a gateway module, and place a packet encapsulation protocol tunnel header within the packet header. Then, a core node is in communication with the SMTS, and includes acceleration modules, the gateway module, and a storage memory. The acceleration module is configured to receive the packets, remove the packet encapsulation protocol tunnel header, store the packet encapsulation protocol tunnel header in the storage memory, and perform acceleration on the packet. The gateway module is further configured to receive the packet after acceleration, retrieve the packet encapsulation protocol tunnel header from the storage memory, replace the packet encapsulation protocol tunnel header on header of the packet, and transmit the packet to the destination.

In another embodiment, a computer-readable medium for implementing acceleration through a packet encapsulation protocol tunnel, is described. The computer-readable medium includes instructions for establishing a packet encapsulation protocol tunnel between a first network endpoint and a second network endpoint, sending packets with a packet encapsulation protocol tunnel header from the first network endpoint to the second network endpoint, and removing the packet encapsulation protocol tunnel headers from the packets. The computer-readable medium further includes instructions for storing the packet encapsulation protocol tunnel headers in a storage memory, performing acceleration on the packets, and retrieving the packet encapsulation protocol tunnel headers from the storage memory. Further, the computer-readable medium includes instructions for replacing the packet encapsulation protocol tunnel headers on the packets, and sending the packets with the packet encapsulation protocol tunnel headers through the packet encapsulation protocol tunnel to the second endpoint.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral to denote one of multiple similar components. When reference is made to a reference numeral without specification to an existing sublabel, it is intended to refer to all such multiple similar components.

DETAILED DESCRIPTION OF THE INVENTION

The ensuing description provides exemplary embodiment(s) only and is not intended to limit the scope, applicability or configuration of the disclosure. Rather, the ensuing description of the exemplary embodiment(s) will provide those skilled in the art with an enabling description for implementing an exemplary embodiment, it being understood that various changes may be made in the function and arrangement of elements without departing from the spirit and scope as set forth in the appended claims. Some of the various exemplary embodiments may be summarized as follows.

Figure 1:
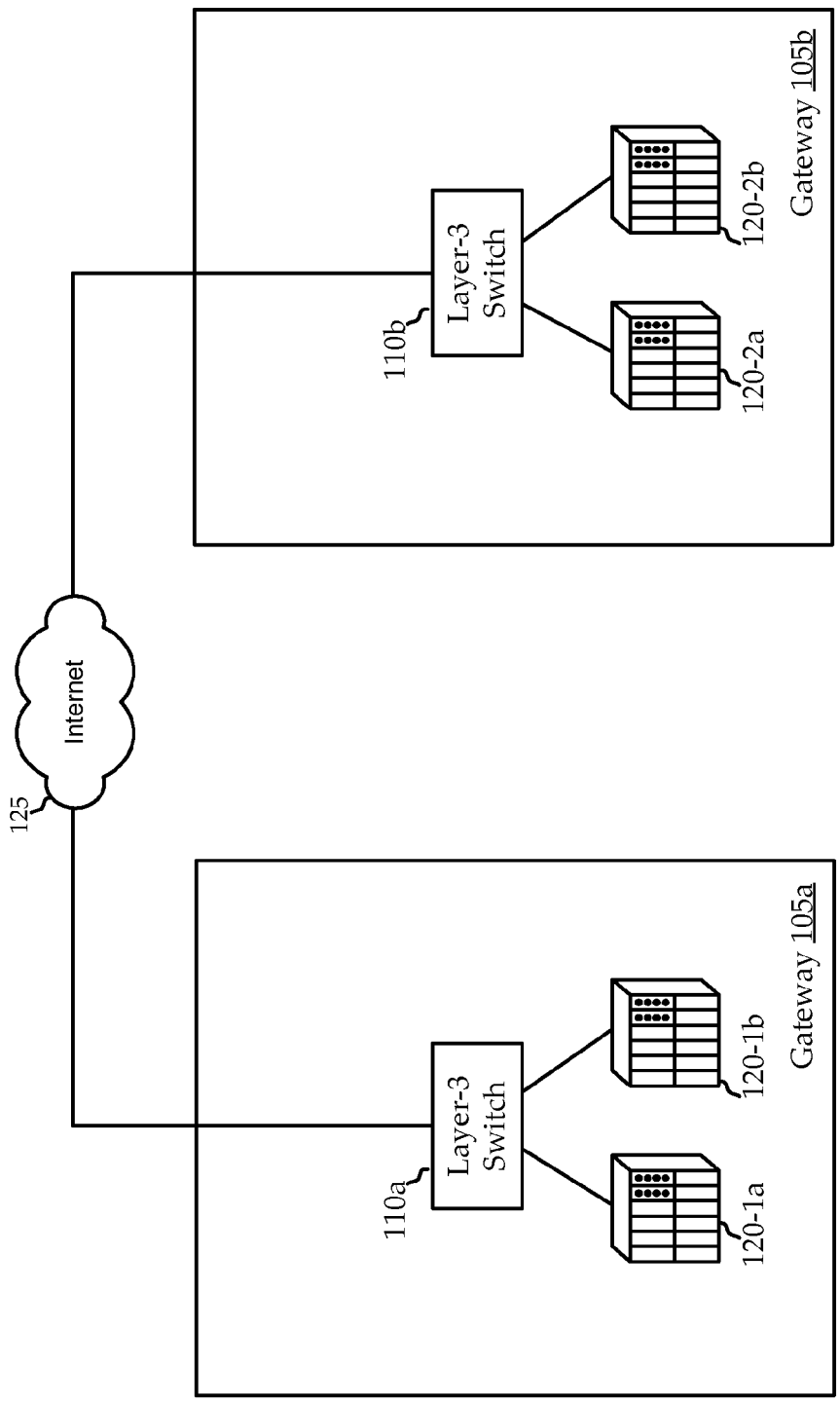
FIG. 1 shows a block diagram of one embodiment of a gateways within a satellite communications network.

FIG. 1 illustrates a gateway 105a in communication with a gateway 105b. Further, gateways 105a and 105b are in communication with the Internet 125. The gateways 105 receive requests at a satellite modem termination system (SMTS) 120. The SMTS 120 sends the request to a layer-3 switches 110 (a and b).

As used herein, a "routed network" refers to a network having a number of routers, configured to use protocols at layer-3 and above of the OSI stack (e.g., or substantially equivalent types of protocols) to route data through the network. The layer-3 switch, as used herein, is intended to broadly include any type of network device configured to route at layers 3 and above of the OSI stack, or provide substantially similar network layer functionality. Particularly, routing is intended to be distinguished from switching (e.g., at layer 2 of the OSI stack (e.g., or substantially similar functionality), as will become more clear from the description below.

Utilizing higher layers to route communications may provide certain features, such as enhanced interoperability. It may also limit certain capabilities of the network. As one exemplary limitation, at each node where a layer-3 routing decision is made, determining the appropriate routing may involve parsing packet headers, evaluating parsed header information against routing tables and port designations, etc. These steps may limit the type of traffic that can be sent over the network, as well as the protocols available for transport on the network.

In another exemplary limitation, at each router, layer-2 headers are typically stripped off and replaced with other tags to identify at least the next routing of the data through the network. As such, it is impossible to maintain a single network between routed terminals. In other words, a packet which is generated at one LAN, which passes through one or more routers (i.e., at layer-3 or above) and is received at another LAN, will always be considered to be received from a different network. Accordingly, any benefit of a single network configuration is unattainable in a layer-3 routed network. For example, tags for supporting proprietary service provider networks, Multiprotocol Label Switching (MPLS), and/or other types of networks are impossible to maintain across large geographic regions (e.g., multiple LANs, WANs, subnets, etc.).

For example, CPEs (not shown) and other client devices connected to gateway 105a could not be located on the same network (e.g., same LAN, subnet, etc.) as CPEs connected to gateway 105b. In other words, once a packets from layer-3 switch 110a were sent to layer-3 switch 110b, the packets would no longer be considered to be on the same network (e.g., LAN, subnet, etc.) as gateway 105a's network. Accordingly, virtual networking protocols such as, VPN, MPLS, etc. must be used for sending traffic between gateway 105a and 105b. Furthermore, depending on the type of service, if the service or services fail on gateway 105a, then gateway 105b may be unable to provide the failed service or services to CPEs connected to gateway 105a (the two gateways are, from a networking prospective, isolated). However, if the traffic between gateway 105a and 105b was switched at layer-2, then gateway 105b would be able to provide the failed service or services to the CPEs connected to gateway 105a.

Figure 2:
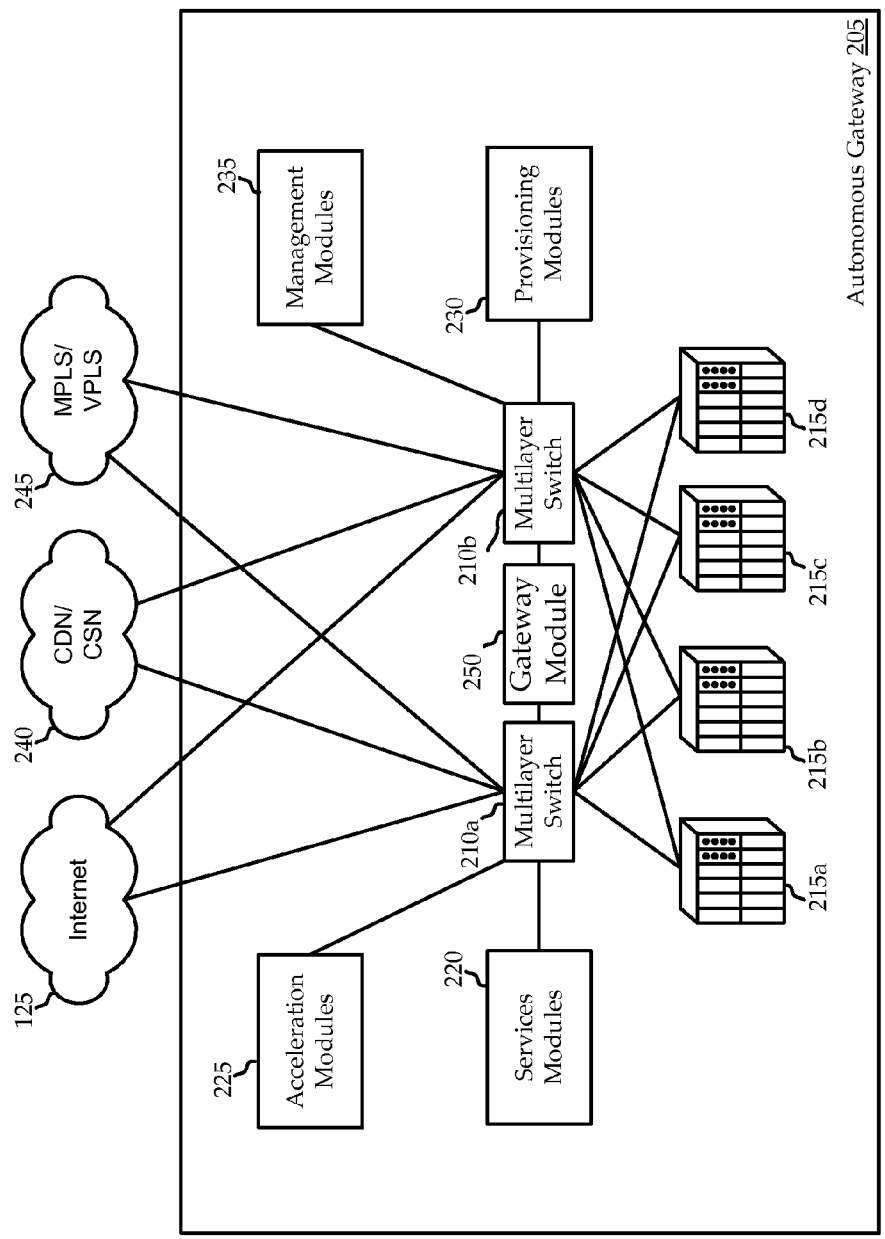
FIG. 2 shows a block diagram of an embodiment of an autonomous gateway, according to various embodiments of the invention.

FIG. 2 shows an embodiment of an autonomous gateway 205, according to various embodiments of the present invention. In some embodiments, the autonomous gateway 205 includes one or more SMTSs 215 (a-d), which implements substantially as the SMTSs 215 of the non-autonomous gateway 305 of FIG. 3. The SMTSs 215 may be in communication with one or more multilayer switches 210a and 210b. The multilayer switches 210a and 210b may be in communication with an gateway module 250, and may also be in communication with the Internet 125, CDN/CSN networks 240, or MPLS/VPLS networks 245. The multilayer switches 210a and 210b may be configured to process data to and from one or more modules. For example, the multilayer switches 210a and 210b may be in communication with services module 220, acceleration modules 225, provisioning modules 230, and/or management modules 235. It will be appreciated that, unlike the gateway 105 of FIG. 1, in accordance with aspects of the present invention, embodiments of the autonomous gateway 205 are able to implement some of the enhanced functionality of the non-autonomous gateways 305 and core node 405.

In one embodiment, autonomous gateway 205 is configured to operate autonomously or separately from other gateways and/or core nodes. For example, using services module 220, acceleration modules 225, provisioning modules 230, and management modules 235, autonomous gateway 205 is able to completely manage requests received through SMTSs 215 and multilayer switches 210a and 210b. Furthermore, since multilayer switches 210a and 210b are equipped to handle requests at both layer-2 and layer-3, autonomous gateway 205 is not limited in the same ways as gateway 105.

In one embodiment, services module 220 may include services, such as AAA, RADIUS, DHCP, DNS, TFTP, NTP, PKI, etc. Furthermore, management modules 235 may include billing, terminal, shell, IP flow information export (IPFIX), traffic and/or flow accounting and analysis, SNMP, syslog, etc. Accordingly, autonomous gateway 205 is equipped to function as a "stand-alone" entity, locally (or pseudo-locally) providing services and management to CPEs.

Figure 3:
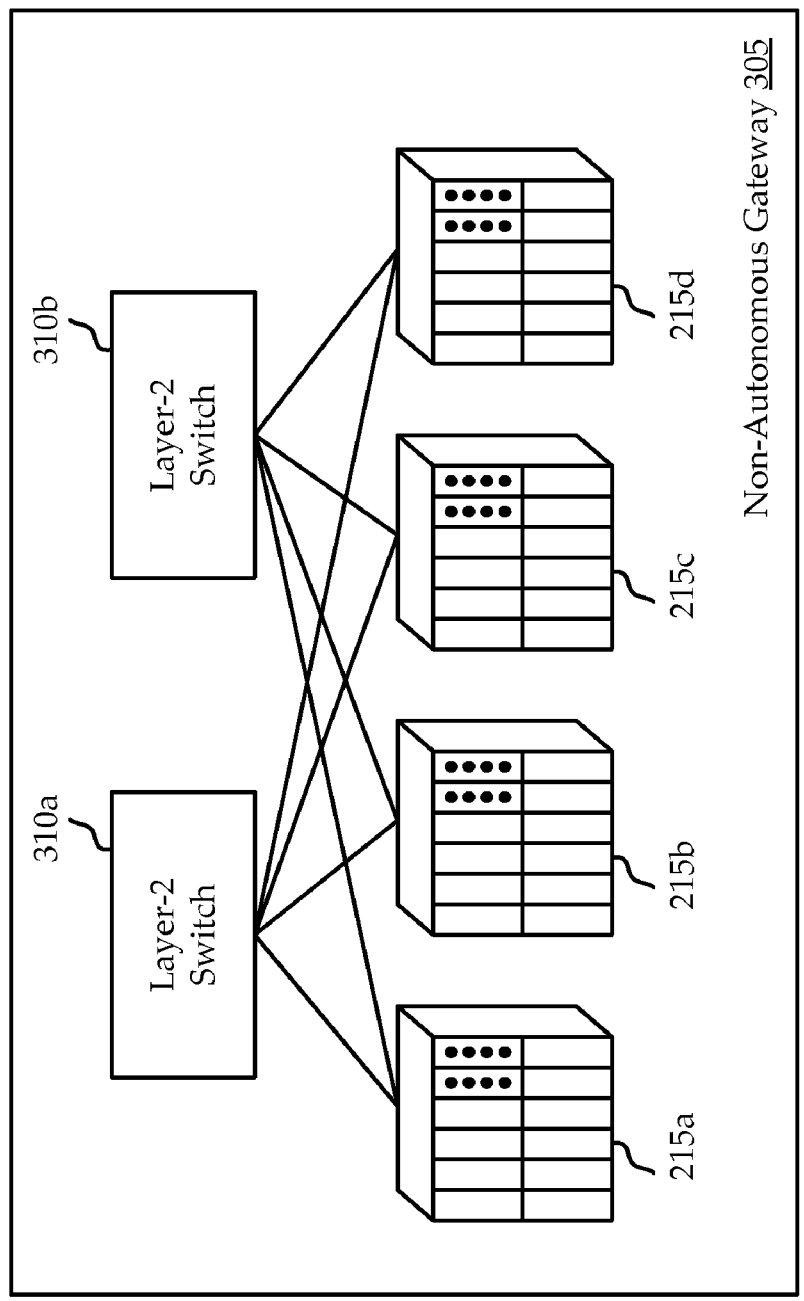
FIG. 3 shows a block diagram of an embodiment of a non-autonomous gateway, according to various embodiments of the invention.

Turning now to FIG. 3, which illustrates an embodiment of a non-autonomous gateway 305 in accordance with embodiments of the present invention, the non-autonomous gateway 305 may include a number of SMTSs 215 (a-d). Embodiments of each SMTS 215 include multiple base stations (not shown). For example, each base station may be implemented on a circuit card or other type of component integrates into the SMTS 215. The illustrated non-autonomous gateway 305 includes four SMTSs 215, each in communication with two layer-2 switches 310a and 310b. For example, each SMTS 215 is coupled with both layer-2 switches 310a and 310b to provide redundancy and/or other functionality. Each layer-2 switch 310 may then be in communication with a core node 405.

Embodiments of the non-autonomous gateway 305 are configured to support minimal functionality and provide minimal services. Unlike the autonomous gateway 205, non-autonomous gateway 305 does not include services module 220, acceleration modules 225, provisioning modules 230, and management modules 235. Hence, the non-autonomous gateway 305 simple design requires minimal management and maintenance, as well as a significantly lower cost than the autonomous gateway 205. Non-autonomous gateway 305 is configured to send and receive communications through SMTSs 215a-d (e.g., to and from a satellite) and similarly send and receive communications through layer-2 switches 310a and 310b (e.g., to and from core node 405).

Figure 4A:
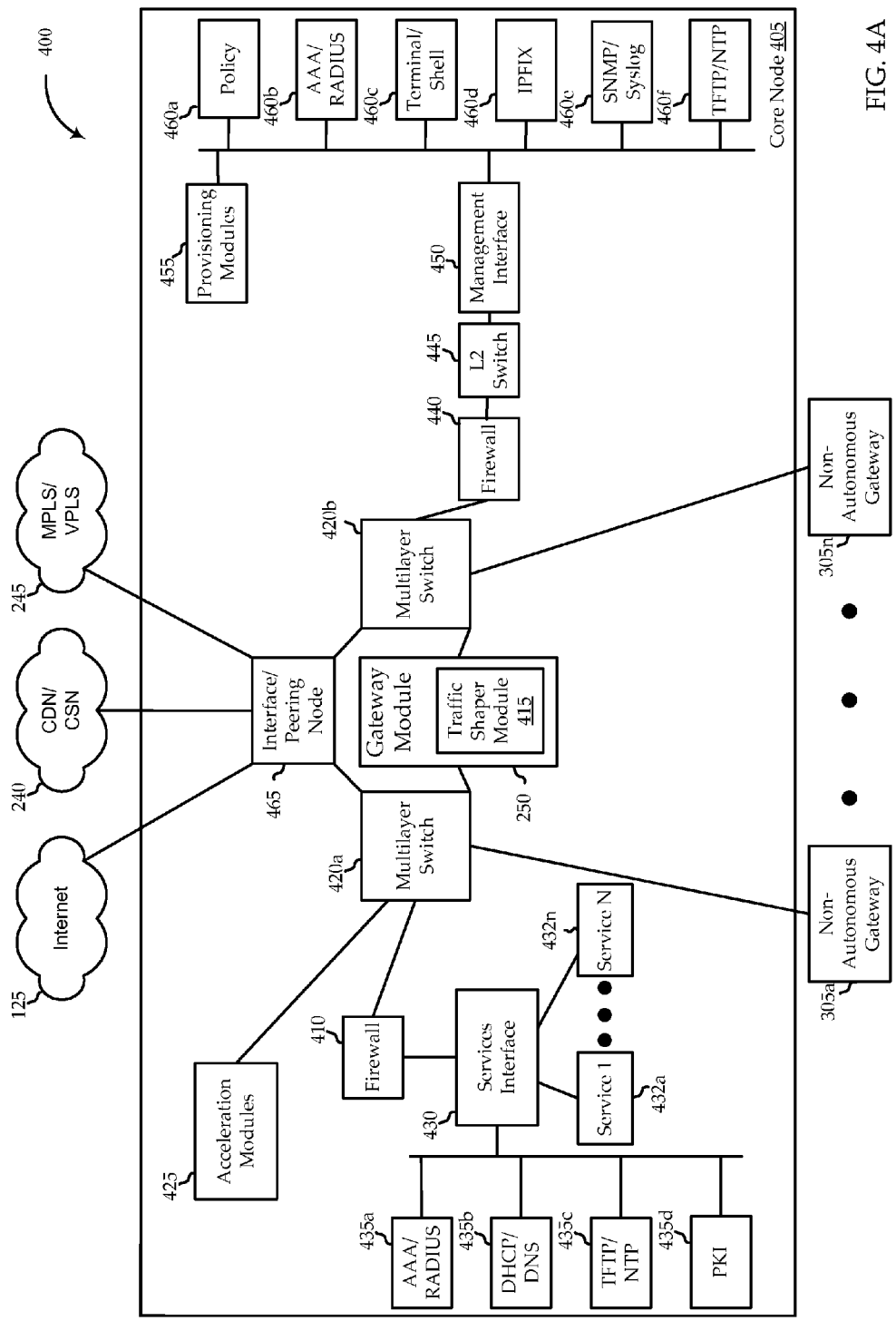
FIG. 4A shows a block diagram of one embodiment of a core node within a satellite communications network, according to various embodiments of the invention.

FIG. 4 illustrates a core node 405, in accordance with one embodiment of the present invention. Core node 405 may be in communication with 1 to N non-autonomous gateways 305. As discussed above, the non-autonomous gateways 305 communicate with the core node 405 using layer-2 connectivity between one or more layer-2 switches 310 in the non-autonomous gateways 305 and one or more multilayer switches 420a and 420b in the core node 405. The illustrative core node 405 is in communication with multiple non-autonomous gateways 305a-305n via multilayer switches 420a and 420b. In various embodiments, the multilayer switches 420a and 420b are in communication with each other either directly or indirectly (e.g., via a gateway module 250).

In some embodiments, the gateway module 250 includes one or more processing components for processing traffic received at the multilayer switches 420a and 420b. In one embodiment, the gateway module 250 includes a traffic shaper module 415. The traffic shaper module 415 is a service which is configured to assist in optimizing performance of network communications (e.g., reduce latency, increase effective bandwidth, etc.), for example, by managing packets in a traffic stream to conform to one or more predetermined traffic profiles.

The multilayer switches 420a and 420b may further be in communication with one or more of the Internet 125, CDN/CSN networks 240, and MPLS/VPLS networks 245. In some embodiments, the core node 405 includes an interface/peering node 465 for interfacing with these networks. For example, an Internet service provider or CDN service provider may interface with the core node 405 via the interface/peering node 465.

Embodiments of the multilayer switches 420a and 420b process data by using one or more processing modules or interfaces in communication with the multilayer switches 420a and 420b. For example, as illustrated, the multilayer switches 420a and 420b may be in communication with AA/RADIUS 435a, DHCP/DNS 435B, TFTP/NTP 435c, or PKI 435d, through a firewall 410 and services interface 430. Furthermore, multilayer switches 420a and 420b may be in communication with a provisioning module 455 through a firewall 440, a layer-2 switch 445, and a management interface 450. In addition to being in communication with provisioning module 455, multilayer switches 420a and 420b may also be in communication with policy module 460a, AAA/RADIUS 460b, terminal/shell 460c, IP flow information export (IPFIX), traffic and/or flow accounting and analysis 460d, SNMP/syslog 460e, and TFTP/NTP 460f. Communication with these modules may be restricted, for example, certain modules may have access to (and may use) private customer data, proprietary algorithms, etc., and it may be desirable to insulate that data from unauthorized external access. In fact, it will be appreciated that many types of physical and/or logical security may be used to protect operations and data of the core node 405. For example, each core node 405 may be located within a physically secured facility, like a guarded military-style installation.

In a further embodiment, services interface may be communication with service 1 432a to service N 432N. Service 1 to service N may be any one of the services described above (i.e., AAA/RADIUS 345a, DHCP/DNS 435b, TFTP/NTP 460f, etc.), as well as other services provided in satellite networking environment. Furthermore, any number of services may be provided (i.e., 1-N number of services).

In one embodiment, the acceleration modules 225 include beam-specific acceleration modules and a failover module which detects a connection failure and redirects network traffic to a backup or secondary connection. Embodiments of the acceleration modules 425 provide various types of application, WAN/LAN, and/or other acceleration functionality. In one embodiment, the acceleration modules 425 implement functionality of AcceleNet applications from Intelligent Compression Technologies, Inc. ("ICT"), a division of ViaSat, Inc. This functionality may be used to exploit information from higher layers of the protocol stack (e.g., layers 4-7 of the OSI stack) through use of software or firmware operating in each beam-specific acceleration module. The acceleration modules 425 may provide high payload compression, which may allow faster transfer of the data and enhances the effective capacity of the network. In some embodiments, certain types of data (e.g., User Datagram Protocol (UDP) data traffic) bypass the acceleration modules 425, while other types of data (e.g., Transmission Control Protocol (TCP) data traffic) are routed through the accelerator module 350 for processing. For example, IP television programming may bypass the acceleration modules 425, while web video may be sent to the acceleration modules 425 from the multilayer switches 420a and 420b.

In one embodiment, the AAA/Radius module 460b may implement functionality of an Authentication Authorization Accounting (AAA) server, a Remote Authentication Dial-In User Service (RADIUS) protocol, an Extensible Authentication Protocol (EAP), a network access server (NAS), etc. Embodiments of the DHCP/DNS module 435b may implement various IP management functions, including Dynamic Host Configuration Protocol (DHCP) interpretation, Domain Name System (DNS) look-ups and translations, etc. Embodiments of the TFTP/NTP module 435c may implement various types of protocol-based functions, including file transfer protocols (e.g., File Transfer Protocol (FTP), trivial file transfer protocol (TFTP), etc.), synchronization protocols (e.g., Network Time Protocol (NTP)), etc. Embodiments of the PKI module 435d implement various types of encryption functionality, including management of Public Key Infrastructures (PKIs), etc.

In a further embodiment, policy module 460a may control certain billing functions, handle fair access policies (FAPs), etc. Embodiments of the terminal/shell module 640c may implement various types of connectivity with individual devices. Embodiments of the SNMP/Syslog module 460e may implement various network protocol management and logging functions. For example, the SNMP/Syslog module 460e may use the Simple Network Management Protocol (SNMP) to expose network management information and the Syslog standard to log network messages.

Figure 4B:
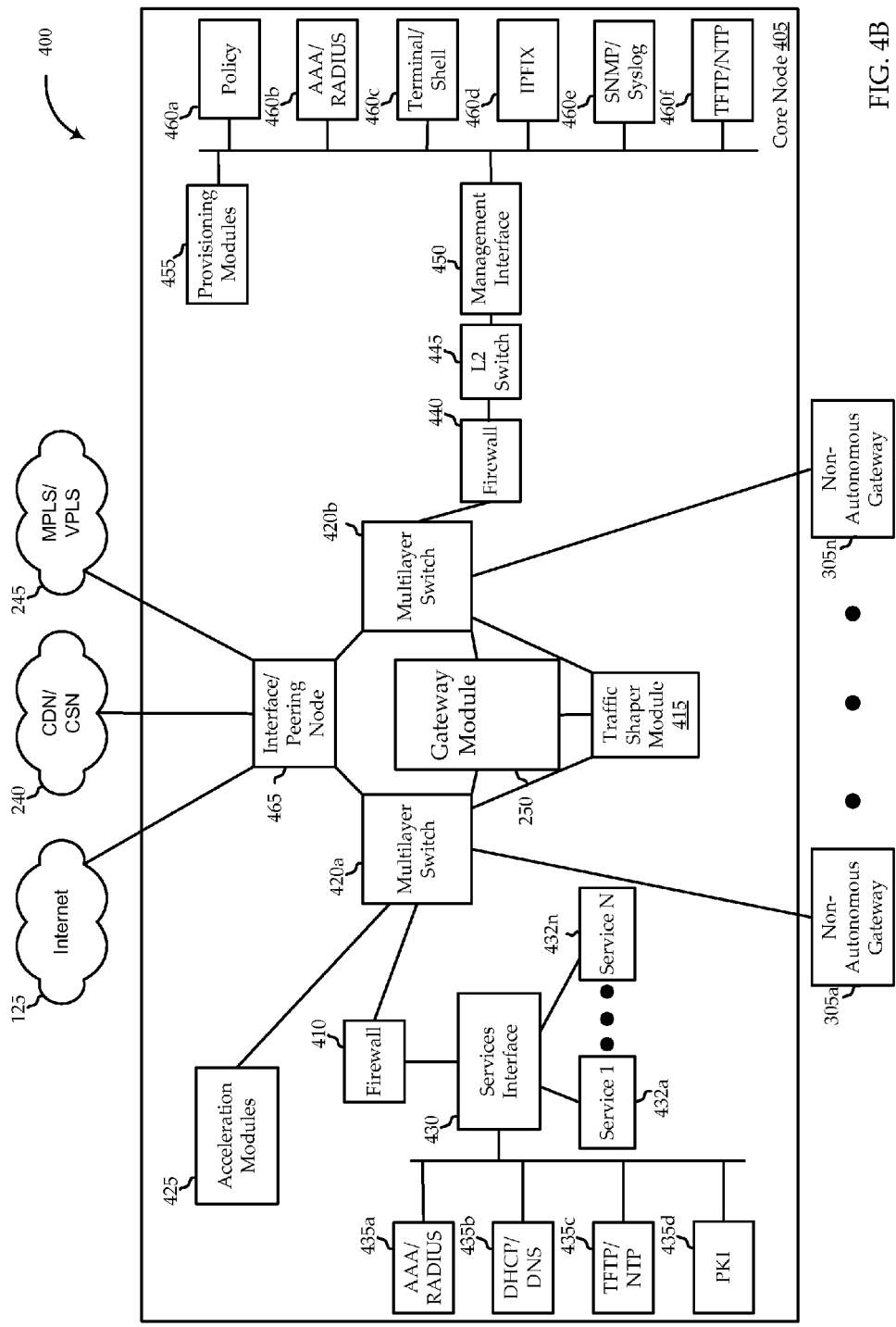
FIG. 4B shows a block diagram of an alternative embodiment of a core node within a satellite communications network, according to various embodiments of the invention.

In an alternative embodiment, FIG. 4B illustrates traffic shaper module 415 operating separately from gateway module 250. In this configuration traffic shaper module 415 may be locally or remotely located from gateway module 250, and may communicate directly with multilayer switches 420a and 420b, or with gateway module 250.

Figure 5A:
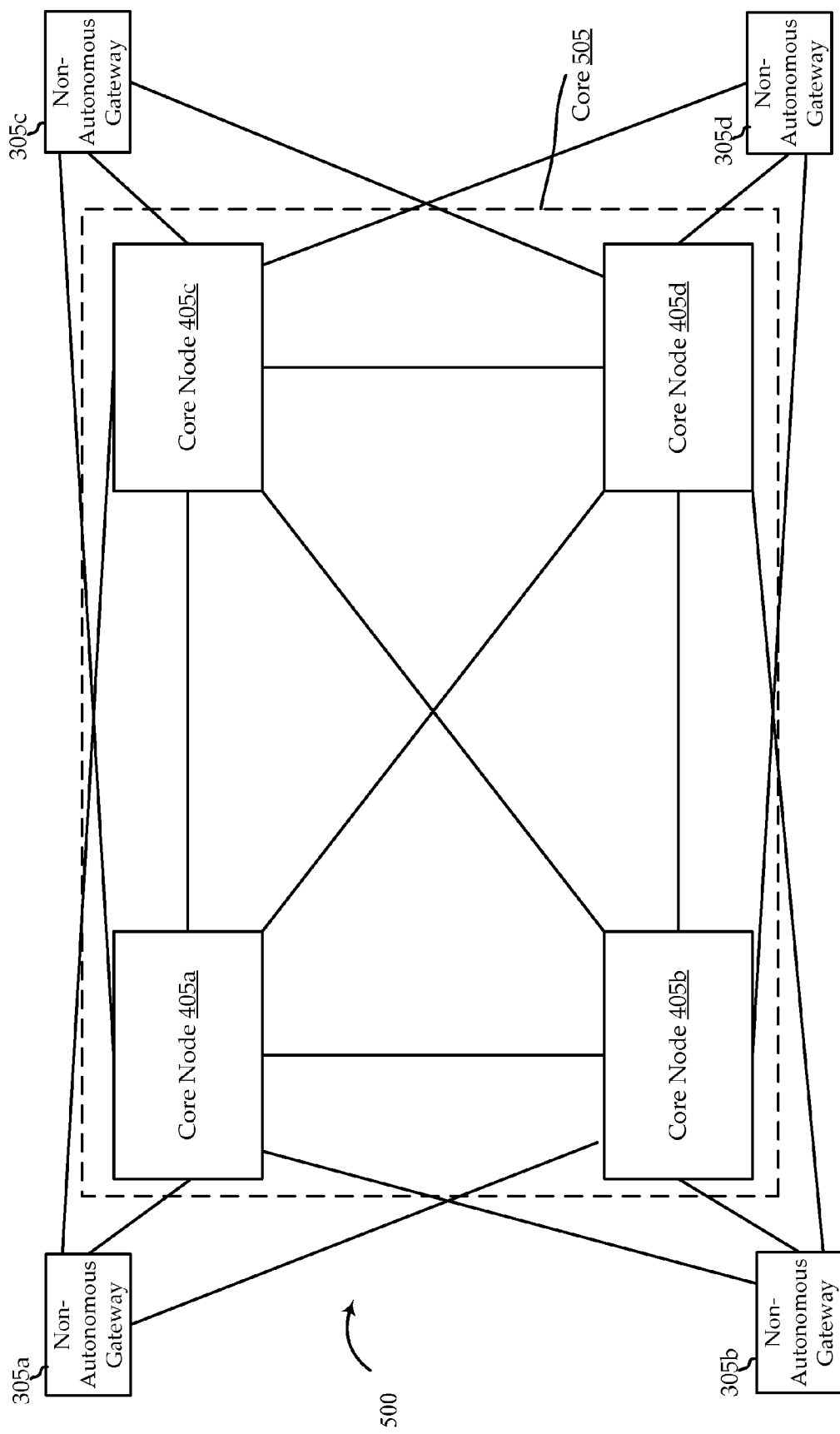
FIG. 5A shows a block diagram of one embodiment of a core node architecture for a satellite communications network, according to various embodiments of the invention.

Accordingly, core node 405 is configured to internally handle various services and functionality. Turning now to FIG. 5A, the diagram illustrates one embodiment of a core-based network architecture 500, implementing a core 505 which includes core nodes 405. In one embodiment, each core node 405a-d is connected to every other core node, and each core node 405a-d is connected to a non-autonomous gateway 305a-d, respectively. This configuration is merely for the purposes of explanation, and it should be noted that any number of core nodes or non-autonomous gateways may be used. Also, core nodes may be indirectly connected to other core nodes, core nodes may be connected to other core nodes through one or more non-autonomous gateway, etc.

Such a network configuration provides significant benefits; for example, service and/or resource specific failure at a core node, or complete failure of a core node is able to be redundantly managed by one or more of the other core nodes, assuming, for the purpose of explanation, that core node 405a services non-autonomous gateway 305a, core node 405b services non-autonomous gateway 305b, and so forth. If, for example, DHCP service at core node 405b fails, then DHCP service requests from the customers connected with non-autonomous gateway 305b would be serviced through core node 405d, without the customers noticing any change. For example, their IP address, their session, etc. would remain the same. Furthermore, the other services provided by core node 405b (e.g., DNS, acceleration, PKI, etc.) would still be handled by core node 405b, and only the failed service would be diverted to core node 405d.

Such a service specific redundancy scheme is possible by this network configuration, in part, because of the end-to-end layer-2 connectivity, the placement of the core nodes, and structure and configuration of the core nodes 405. For example, if the network did not have end-to-end layer-2 connectivity, then such redundancy would not be possible. If the packets were routed (i.e., layer-3 or above), or virtually switched (i.e., MPLS), then once a packet went from core node 405b to core node 405d, the MAC header of the packet would be altered, and as such, the network (i.e., the LAN, subnet, etc.) of the packet would change. Accordingly, the ability to provide service through the new core node (e.g., core node 405d) would be lost.

Similarly, if a core node completely fails or the connection (e.g., fiber cable) between a core node and a non-autonomous gateway fails, then all of the operations of the failed core node are able to be assumed by (or diverted to) one or more other core nodes. For example, if the connection between non-autonomous gateway 305a and core node 405a is cut or damaged, then core node 405c may provide the services, that were previously provided by core node 405a to non-autonomous gateway 405a. In one embodiment, in both examples the core node assuming the failed service in response to a complete failure may be notified of the failure by, for example, time-to-live (TTL) packets, acknowledgment packets, etc. If the core node's functions fall below a threshold, another core node may be triggered to assume servicing of the failed service (or services).

Furthermore, such a network configuration is configured to allow sharing of resources among the core nodes. For example, one or more resources at one core node may be over-burdened, while other core nodes may be running under capacity. In such a situation, some or all of the services from the over-burdened core node may be diverted to one or more other core nodes. As such, the usage of all cores may be distributed in order to maximize core node resource use and avoid a core node from being over committed.

It should be noted that any available path within network 500 may be used. For example, it may be more efficient or necessary for a failed service at core node 405c to be handled by core node 405b, by passing though non-autonomous gateway 305d. As such, network 500 provides completely dynamic paths among the core nodes 405 and non-autonomous gateways 305. Furthermore, within network 500, any service can be provided to any customer by any core at any time. In one embodiment, core node connectivity may be fully meshed at layer-2 using VPLS.

In one embodiment, because core node 405 is configured to provide end-to-end layer-2 connectivity across a network, core node 405 is able to more easily peer with one or more public or private networks. For example, a public or private networks may connect with non-autonomous gateway 305d. The customers connected to non-autonomous gateways 305a-c can receive the content from the peering node connected to non-autonomous gateway 305d, as though the peering node was connected directly to their respective non-autonomous gateways 305a-c. This is due, in part, to the end-to-end layer-2 connectivity and inter-code connectivity. As such, the content provided by the peering node to customers connected with non-autonomous gateway 305d is also provided to each of the other customers connected with non-autonomous gateways 305a-c. As such, peering at one node that is geographically dispersed from another nodes (or gateways) are able to provide access to the network for which the first node is peered with. For example, by peering with a network in Dallas, network 400 has access to the network from Denver (or anywhere else with network 400).

For example, a peering node in Dallas connected to a non-autonomous gateway 305 in Dallas can provide their content to customers in San Francisco (e.g., non-autonomous gateway 305a), Denver (e.g., non-autonomous gateway 305b), and Salt Lake City (e.g., non-autonomous gateway 305c), by only connecting through a single drop point (i.e., Dallas). As such, a peering node providing content significantly increases the number of customers, without adding additional drop points. This is particularly useful in a peering context because in order for a peering relationship to exist, the two networks need to be "peers" (i.e., be relatively equal in content and customer base). Network 500 significantly increases the number of customers that the entity implementing network 500 can represent to the potential peer, thus increasing the likelihood of developing a peering (or equal) relationship.

Similar to a peering node, network 500 may connect with content service network (CSN) 240 and/or a content delivery network (CDN) 240 through one or more gateways 305. Like a peering relationship, CSN/CDN 240 provides content and services to a network provider, and typically such CSN/CDNs 240 are located at high traffic areas (e.g., New York, San Francisco, Dallas, etc.). Moving these CSN/CDNs 240 to more remote or more locations is often not economical. Accordingly, network 500 allows CSN/CDN 240 to connect at any gateway 305 or core node 405, and not only provide the content and/or services to the customers at the connected core node 405 or non-autonomous gateway 305, but to customers within the entire network 500 connected to all non-autonomous gateways 305 and core nodes 405. Thus, the CSN/CDN 240 can connect at one drop point and provide content to all customers within network 500.

This, in part, is made possible by the end-to-end layer-2 connectivity of network 500. If the network was routed, then the customers not directly connected to the gateway or core node at the drop point for the CSN/CDN 240, are difficult to be on the same network and would not be able to receive the content and services. Furthermore, the redundancy scheme of network 500 provides a sufficient amount redundancy to accommodate for such a large number of customers. Without the redundancy scheme of network 500, CSN/CDN 240 would not be able to be sufficiently supported.

Additionally, network 500 is capable of utilizing out-of-band failover networks for additional redundancy (e.g., out of band (OOB) network). Again, the out-of-band network can only be connected to one non-autonomous gateway 305 or core node 405, but still provide the redundancy to any part of network 500. As such, network 500 needs only to connect to the out-of-band network at one location in order to gain the benefit of the out-of-band network throughout the entire network 500.

Furthermore, it should be noted that the configuration illustrated in FIG. 5A should not be construed as limiting, and any number of variations to the network architecture may be used. For example, a non-autonomous gateway may be connected to two core nodes and no other non-autonomous gateways. Alternatively, the core nodes may note be interconnected and/or a non-autonomous gateway may be placed between two core nodes. As such, any number of variations may be implemented.

Figure 5B:
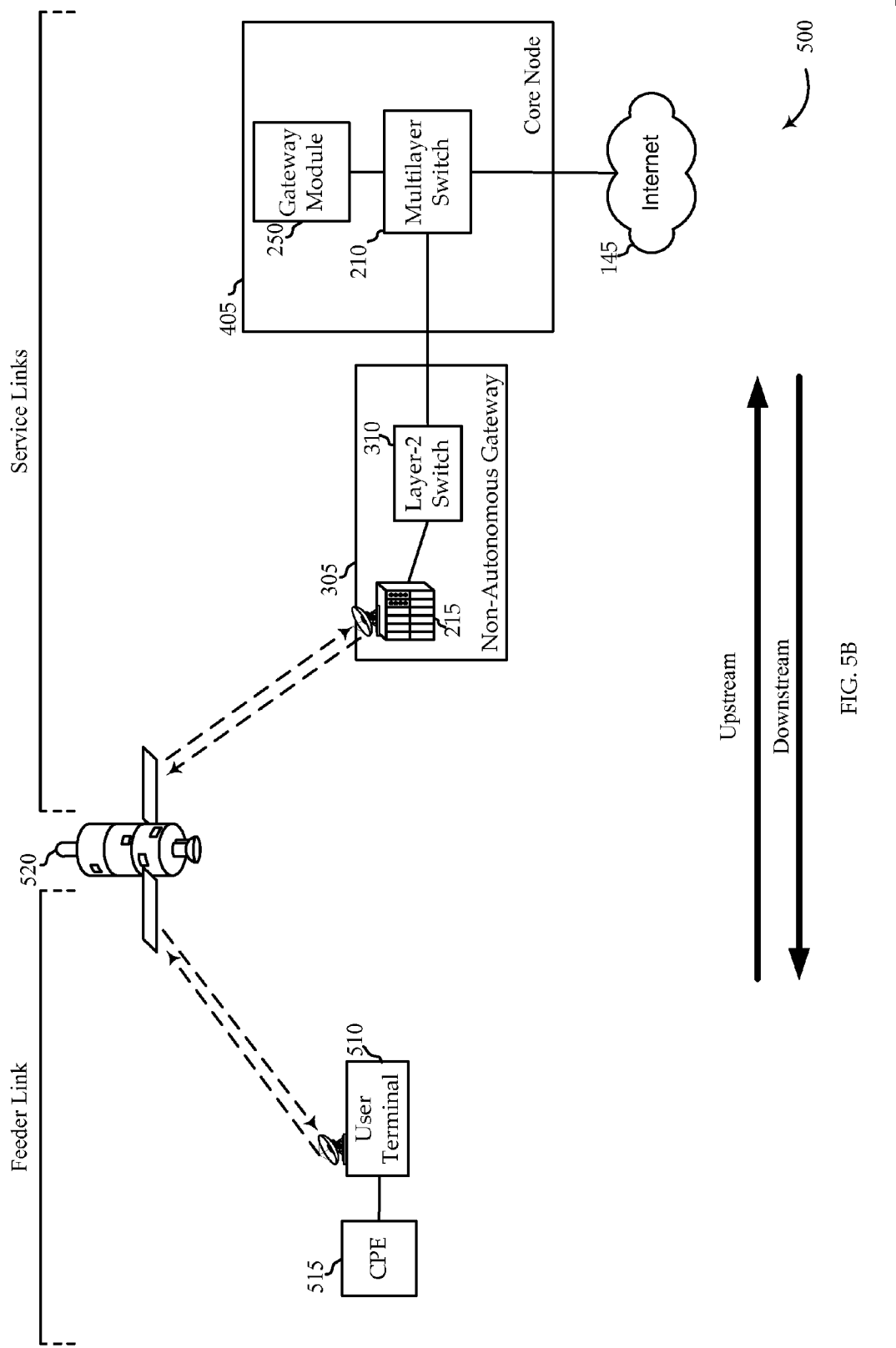
FIG. 5B shows a block diagram of one embodiment of flow of a core node architecture for a satellite communications network, according to various embodiments of the invention.

FIG. 5B shows an illustrative communication link between a customer premises equipment (CPE) 515 (i.e., customer, client, etc.) and Internet 145, through a core node 405. In one embodiment, a request is generated at CPE 515, which is sent to UT 510 and then transmitted over satellite 520 to a base station (not shown) in an SMTS 215 at non-autonomous gateway 405. The request is switched at layer-2 through layer-2 switch 310 and sent to a multilayer switch 210 at core node 405. Core node 405 then sends the request to Internet 145 (or any other network destination). A response back to CPE 515 then would flow back though the network, in the same or similar manner.

Figure 6:
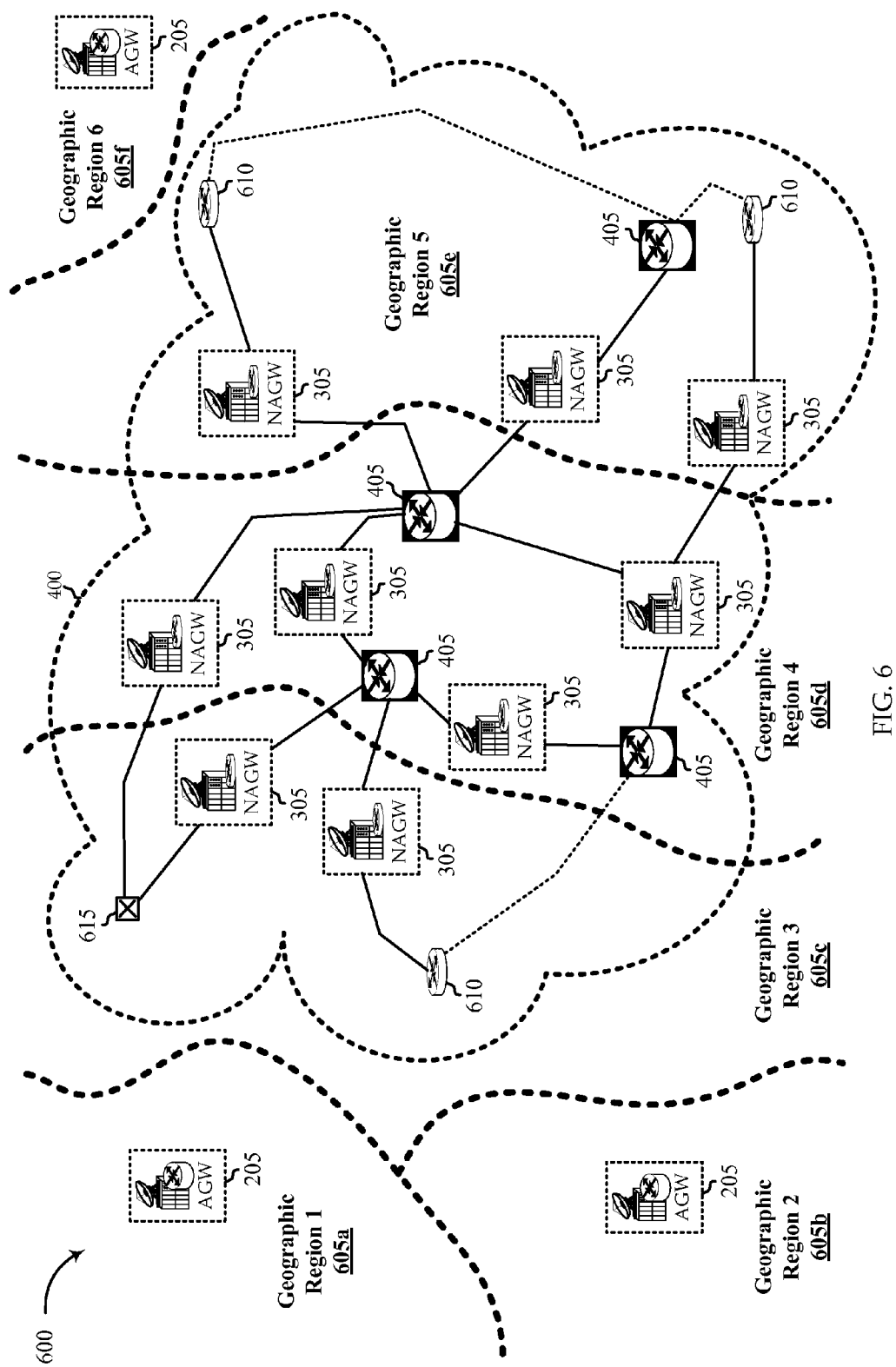
FIG. 6 shows a block diagram of one embodiment of a geographic topology for a core node architecture within a satellite communications network, according to various embodiments of the invention.

FIG. 6 shows an embodiment of a satellite communications network 600 that distributes autonomous gateways 205 and non-autonomous gateways 305 across a number of geographically dispersed regions 605, according to various embodiments. In one embodiment, a first geographic region 605*a*, a second geographic region 605*b* and a sixth geographic region 605*f* represent environments where it is not cost-effective to provide communications with core nodes 265. As such, these geographic regions 605 are illustrated as having autonomous gateways 205. For example, autonomous gateways 205 may be used in island regions, geographically remote regions, regions with particular types of topologies (e.g., large mountain ranges), etc.

In contrast to the above-mentioned regions (geographic regions 605*a*, 605*b*, and 605*f*), a third geographic region 605*c*, a fourth geographic region 605*d*, and a fifth geographic region 605*e* indicate regions where it is cost-effective to implement a core-based non-routed ground segment network 600. As illustrated, each non-autonomous gateway 305 is either directly or indirectly in communication with at least one core node 305 (e.g., typically two core nodes). Other components may also be included in the non-routed ground segment network 600. For example, additional switches 610, optical cross-connects 615, etc. may be used. Further, while the non-routed ground segment network 600 is configured to provide point-to-point layer-2 connectivity, other types of connectivity may also be implemented between certain nodes. For example, one or more VPLS networks may be implemented to connect certain nodes of the non-routed ground segment network 600.

In various embodiments, core nodes 405 may be located on a new or existing fiber run, for example, between metropolitan areas. In some configurations, the core nodes 405 may be located away from the majority of spot beams (e.g., in the middle of the country, where much of the subscriber population lives closer to the outsides of the country). In alternative embodiments, core nodes 405 may be located near the majority of spot means. Such spatial diversity between code nodes and subscriber terminals may, for example, facilitate frequency re-use of between service beams and feeder beams. Similarly, non-autonomous gateways 305 may be located to account for these and/or other considerations.

It is worth noting that twelve gateways (e.g., including both non-autonomous gateways 305 and autonomous gateways 205) are illustrated. If all were implemented as autonomous gateways 205, the topology may require at least twelve gateway modules, routers, switches, and other hardware components. Further, various licensing and/or support services may have to be purchased for each of the autonomous gateways 205. In some cases, licensing requirements may dictate a minimum purchase of ten thousand licenses for each gateway module, which may require an initial investment into 120 thousand licenses from the first day of operation.

Using aggregated functionality in one or more core nodes 405, however, minimizes some of these issues; for example, by including four core nodes 405, each having a gateway module, and only three of the twelve gateways are autonomous gateways 205. As such, only seven gateway modules may be operating on the non-routed ground segment network 220. As such, only seven instances of each core networking component may be needed, only seven licenses may be needed, etc. This may allow for a softer ramp-up and other features. As can be readily seen, such a consolidation of the autonomous gateway functionality into fewer more robust core nodes 405 is a significant cost savings.

Such a network as network 600 (also network 500) provides geographically expansive network capabilities. Where other nationwide or worldwide network are routed or connected at layer-2.5, layer-3, or higher (e.g., MPLS, etc.), networks 500 and 600 are end-to-end layer-2 switched networks. Such a network, in essence, removes the geographic constraints. Since, for example, if a customer was connected with one of the non-autonomous gateways 305 in geographic region 3 605c, and another customer was connected with one of the non-autonomous gateways 305 in geographic region 5 605e, the two customers would be configured as though they were connected to the same switch in the same room.

Figure 7A:
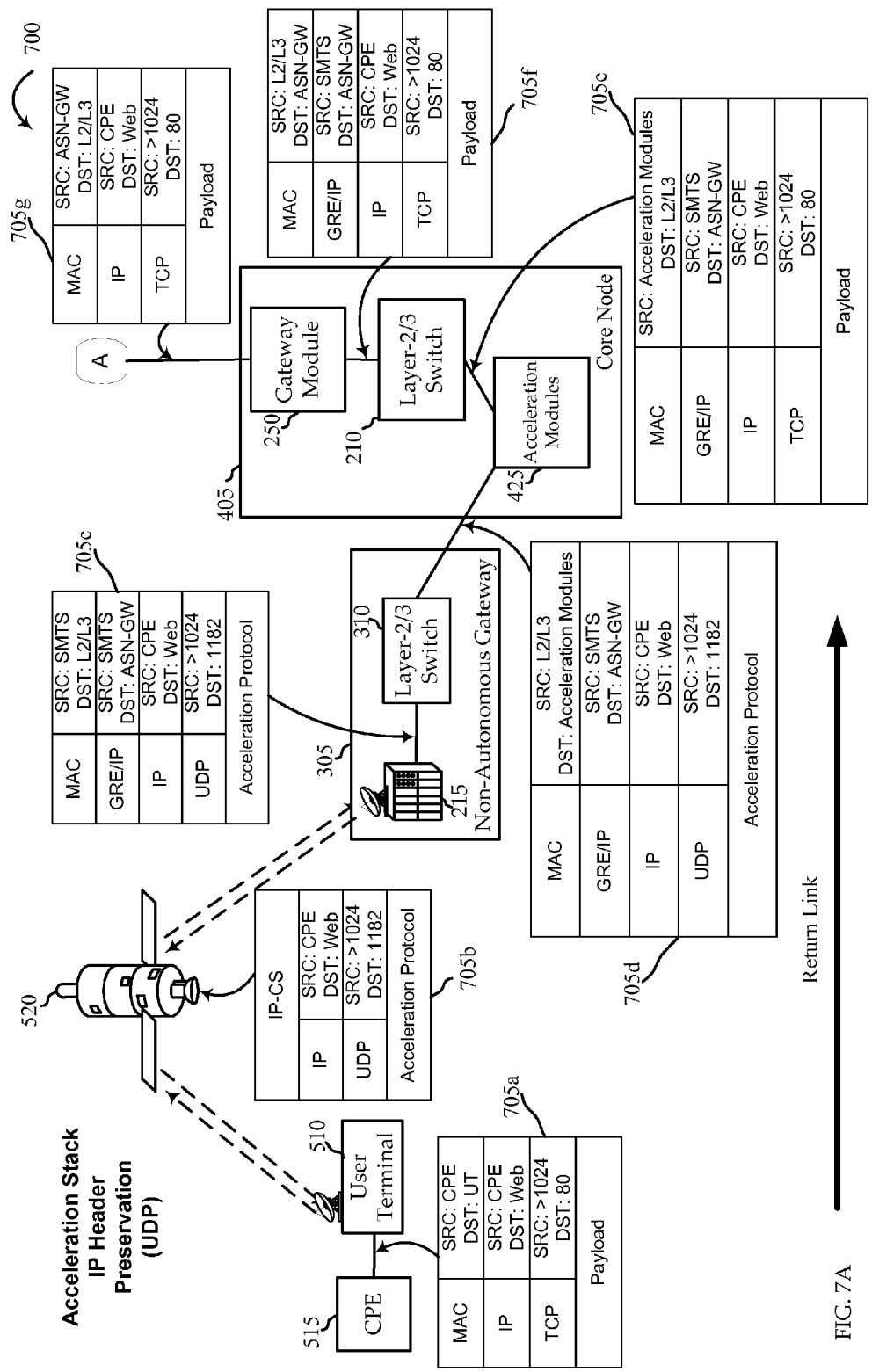
FIG. 7A shows a block diagram of one embodiment of flow for implementing acceleration through a tunnel, according to one embodiment of the invention.

FIG. 7A shows a block diagram of one embodiment of flow for implementing acceleration through a tunnel, according to various embodiments of the invention. In one embodiment, network 700 may include CPE 515 in communication with user terminal (UT) 510. In one embodiment, CPE 515 may initiate a network request(s) and transmit the request to UT 510. The network request may be a web request (e.g., a browser request for web content, a webpage request, a file request from an FTP server, a streaming video request, etc.). The request may be included as the payload of a packet 705a.

In multiple embodiments, packet 705a may also include a packet header. The packet header may include a MAC header, an IP header, and a TCP header. Each of the MAC, IP, and TCP headers may include a source (SRC) and a destination (DST). In this example, the request is for a website (i.e., XYZ.com) and in packet 705a, the MAC SRC is CPE 515 and MAC DST is UT 510. The IP header SRC is CPE 515 and DST is XYZ.com (i.e., Web). The TCP header SRC and DST indicate port assignments (e.g., port 80 for web traffic, port 21 for FTP traffic, etc.).

Further, packet 705a is transmitted via satellite 520 to SMTS 215 in non-autonomous gateway 305. Prior to transmission, UT 510 changes packet 705a to that of packet 705b. The Internet Protocol Convergence Sublayer (IP-CS) protocol header (or alternatively Ethernet Convergence Sublayer Eth-CS) is used to modify the MAC header and the payload is replaced with an acceleration protocol (e.g., Intelligent Compression Technology (ITC) transport protocol (ITP)). A UDP header may be added to the port designations for the SRC and DST. Such a protocol is configured to allow for acceleration/compression techniques to be performed on the payload of the packet. The details of such compression and acceleration are beyond the scope of this patent. Suffice it to say, a number of various compression algorithms, acceleration techniques, etc. may be used. For example, byte caching, prefetching, multicasting, delta coding, etc. may be used by the acceleration protocol.

As such, because of the compression and other acceleration techniques, the amount/size of data transmitted over satellite 520 and/or between non-autonomous gateway 305 and core node 405, can be greatly reduced.

Conversely, a network provider would be unable to efficiently and effectively service customers if compression and acceleration were not possible over a long delay satellite network. Furthermore, compression allows valuable satellite bandwidth to be freed up, allowing the network operator to either offer more bandwidth to existing customers or add new customers on the network. Accordingly, network 700 provides a network provider with the ability to compress and accelerate network traffic.

Once packet 705b is received at SMTS 215, packet 705b is altered to resemble packet 705c. In one embodiment, a packet encapsulation protocol tunnel is established. In this example, the tunnel extends from SMTS 215 to gateway module 250. Other tunnels may be used and the tunnel beginning point and end point may be different. Furthermore, many packet encapsulation protocols may be used. For example, the Generic Routing Encapsulation (GRE) protocol, IP in IP protocol (IP-IP), etc. may be used. In this example, the GRE protocol is shown; however, IP-IP or any other packet encapsulation protocol could have been shown.

For example, GRE is a tunneling protocol that can encapsulate a wide variety of network layer protocol packet types inside IP tunnels, creating a virtual point-to-point link to various brands of routers at remote points over an Internet Protocol (IP) internetwork. IP-IP is an IP tunneling protocol that encapsulates one IP packet in another IP packet. To encapsulate IP packet in an IP packet, an outer header is added with SRC, the entry point of the tunnel and the destination point, the exit point of the tunnel, etc.

As such, in order to establish the tunnel, packet 705c's header is changed to include a GRE/IP header where the SRC is SMTS 215 and the DST is gateway module 250. Hence, the tunnel start point and end point are defined in this GRE/IP header. Furthermore, the MAC header is replaced and the SRC is changed to SMTS 215 and the DST is changed to layer-2/3 switch 310. The IP header remains the same, and the UDP header also remains the same.

Layer-2/3 switch 310 receives packet 705c and changes the MAC SRC and DST to Layer-2/3 switch 310 and acceleration modules 425, respectively (packet 705d). All other aspects of packet 705c's header and payload remain the same. In one embodiment, acceleration modules 425 store the IP header information in a storage memory in order to preserve the header. The IP header may be stored in a hash table or any other storage construct. The acceleration of the payload occurs and the IP header is retrieved from the storage memory and replaced in packet 705e's header along with the payload. The SRC and DST are changed to acceleration module 425 and Layer-2/3 switch 210, respectively.

Packet 705e passes through gateway module 250 (i.e., packet 705f), or may proceed directly to point A (e.g., the Internet, an HSIP, etc.). Before travelling to the Internet, packet 705g's header has the GRE/IP header removed, indicating that the packet is out of the packet encapsulation protocol tunnel. As can be seen from packets 705a and 705g, the IP header, the TCP header, and the payload are preserved. Also, accounting occurs after the gateway module 250 and the full payload (or bandwidth consumption) is properly accounted for. Thus, no revenue is lost due to compression.

Furthermore, packet header preservation occurs such that, for example, the IP Communications Assistance for Law Enforcement Act (CALEA) requirements are maintained. Since CALEA required that the source and the destination of each packet is able to be traced, this header preservation provides such traceability. Additionally, in one embodiment, gateway module 250 may include traffic shaping functionally. Traffic shaping on packets within the tunnel is not possible. Further, one benefit of being able to do acceleration in the tunnel is that it is merely a "bump in the wire." Since packets coming out of the gateway module 250 are the same as the packets that left the CPE, the MAC-PHY transformations that occurred are transparent and therefore, external shapers can be used to enforce network QoS, policies, etc.

In a further embodiment, network 700 provides the ability for temporarily striping away the tunnel encapsulation, acceleration, tracking, shaping, accounting, etc. of the packets, and then putting the tunnel encapsulation back on. The process is transparent to the customer and the network components. For example, if gateway module 250 received an ITP packet, gateway module 250 would not know what to do with the packet. In other words, the packet would not have the correct header or payload information which gateway module 250 was expecting. Accordingly, significant benefits are achieved.

Figure 7B:
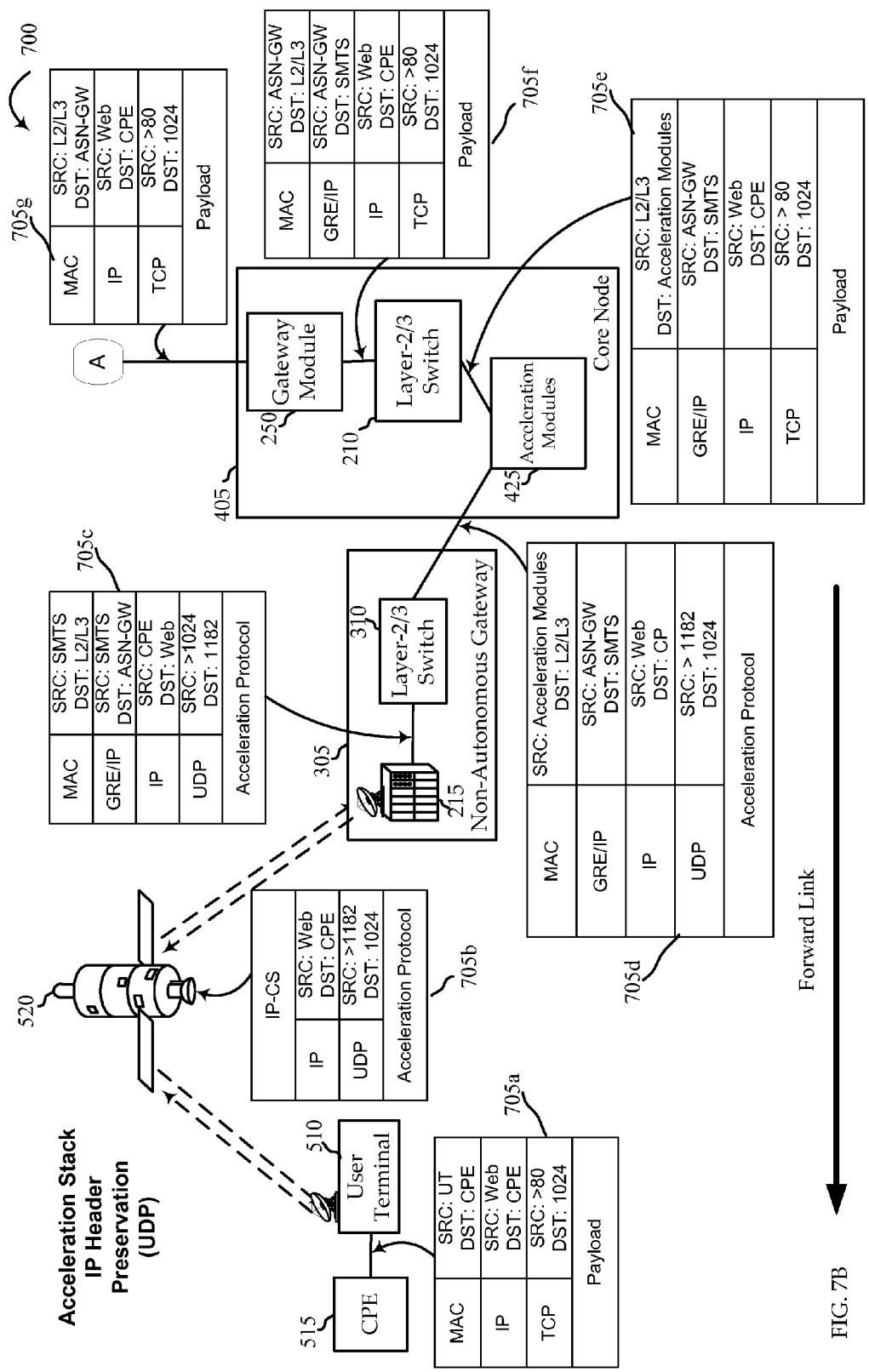
FIG. 7B shows a block diagram of one embodiment of flow for implementing acceleration through a tunnel, according to another embodiment of the invention.

Turning now to FIG. 7B, the diagram illustrates the forward link portion of network 700. As can be seen from the packet 705(a-g) headers, the same or similar process described with respect to FIG. 7A is shown, with each of the SRCs and DSTs being swapped (i.e., in order to direct the packets to move back through network 700).

Figure 8A:
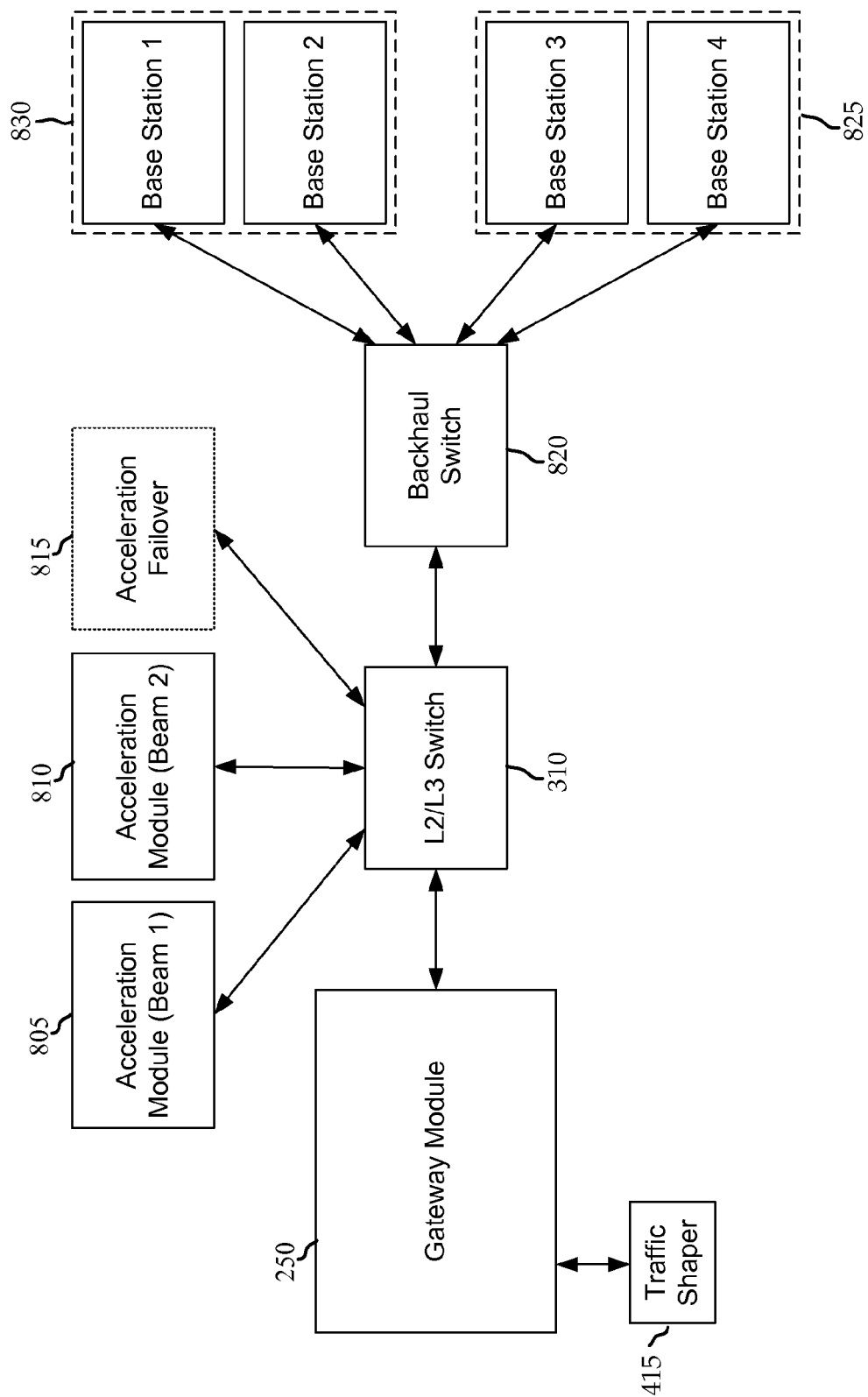
FIG. 8A shows a block diagram of one embodiment of flow for implementing acceleration through a tunnel, according to a further embodiment of the invention.
Figure 8B:
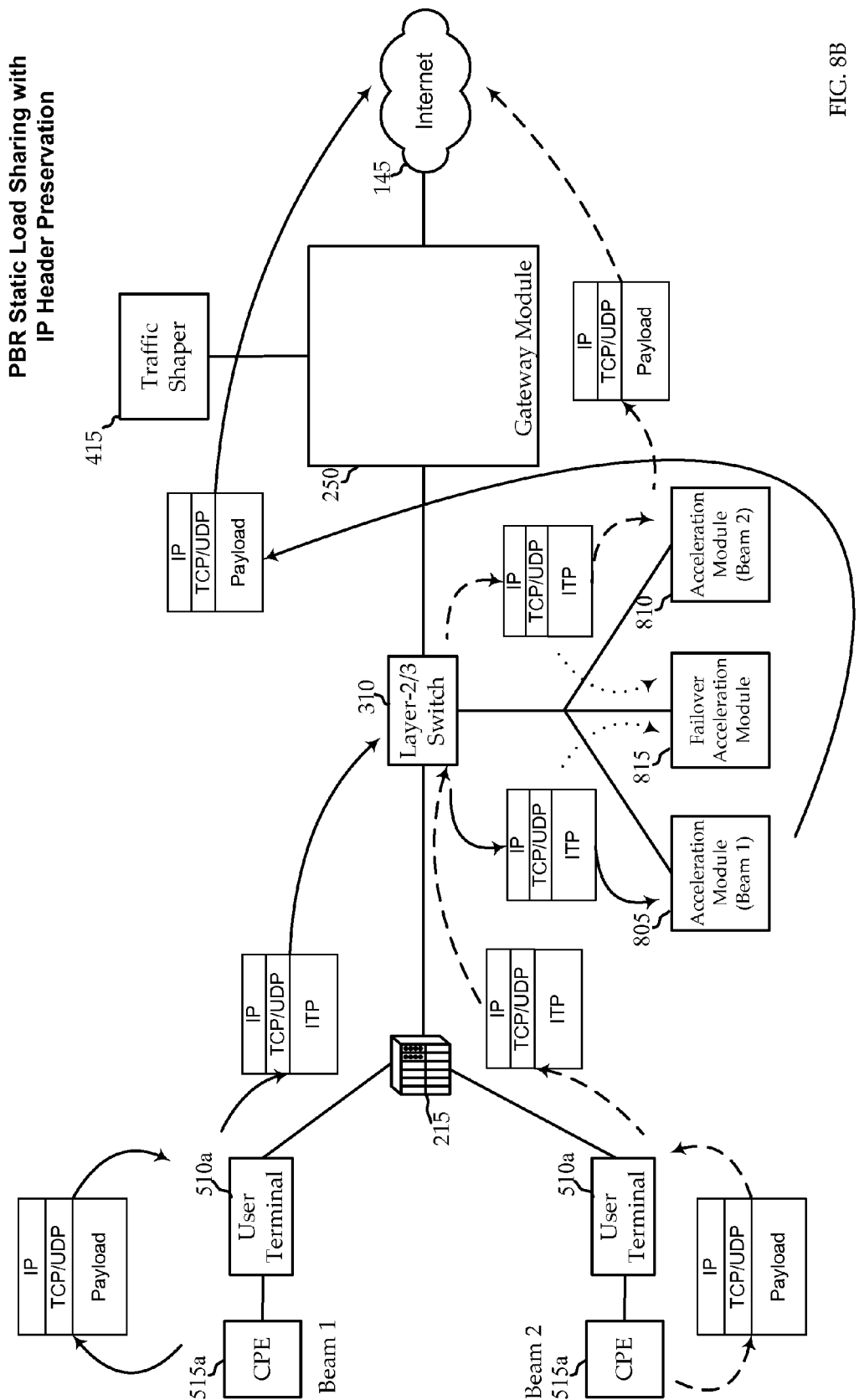
FIG. 8B shows a block diagram of one embodiment of flow for implementing acceleration through a tunnel, according to yet another embodiment of the invention.

FIGS. 8A and 8B show block diagrams of one embodiment of flow for implementing acceleration through a tunnel, according to various embodiments of the invention. FIG. 8A relates to networks 400 and 500 as shown in FIGS. 4A-5B. In one embodiment, the acceleration shown in FIGS. 8A and 8B may be implemented by either one of networks 400 or 500. For example, FIG. 8B shows Policy Based Routing (PBR) static load sharing with IP header preservation. In this example, SMTS 215 supports two beams (beam 1 and 2). Furthermore, CPE 515a is supported by beam 1 and CPE 515b is supported by beam 2. Additionally, each beam is supported by an acceleration module and a failover acceleration module 815. Beam 1 is supported by acceleration module 805 and beam 2 is supported by acceleration module 810.

Similar to FIGS. 7A and 7B, packets from CPEs 515a and 515b flow through the network and enter a packet encapsulation tunnel between SMTS 215 and gateway module 250. The solid lined arrows represent the packet flow from CPE 515a's packets, and the dashed lines represent packet flow for CPE 515b's packets. Based in part on the encapsulation tunnel keys associated with each of CPE 515a and 515b, the packets are directed to acceleration modules 805 and 810, respectively. Furthermore, if one or more of acceleration module 805 and 810 fail, then failover acceleration module 815 is directed to provide acceleration for the packets for the beam of the failed acceleration module. For example, when the layer-2/3 switch 310 detects a link failure to acceleration module 805, or if a health check on the application status fails, then traffic is directed to the failover acceleration module 815.

Figure 9:
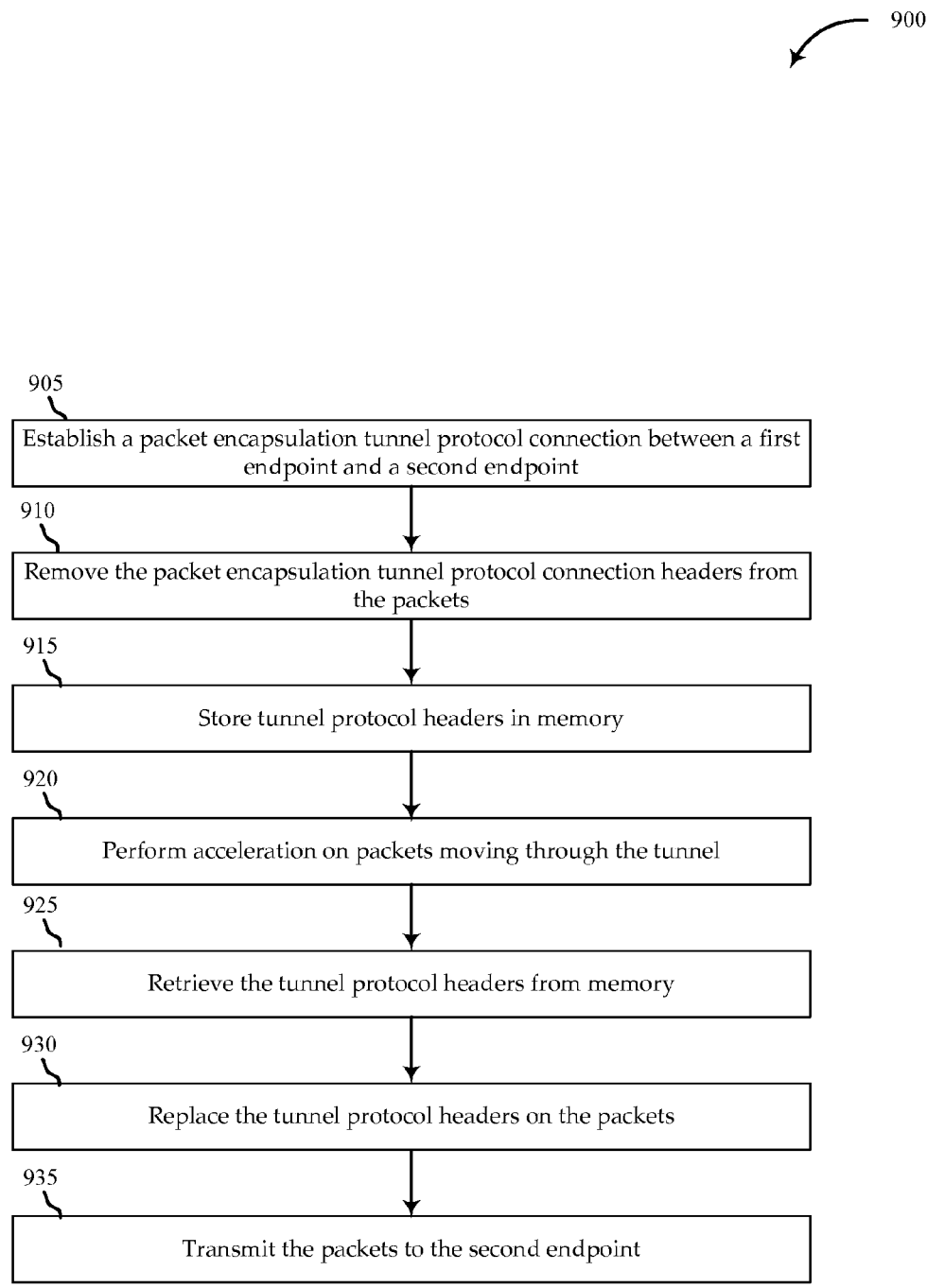
FIG. 9 shows a flow diagram of a method for implementing acceleration through a tunnel, according to various embodiments.

FIG. 9 shows a flow diagram of a method for implementing acceleration through a tunnel, according to various embodiments. At process block 905, a packet encapsulation tunnel connection between a first network endpoint and a second network endpoint is established. The packet encapsulation protocol may be, for example, a GRE tunnel, an IP-IP tunnel, etc. One problem with tunnels is that since the tunnel packet header encapsulates the IP packet (as if the IP packet is in an envelope), determining what is inside the tunneled packet is difficult or impossible, without pulling the packet out of the encapsulation. Accordingly, aspects of method 900 pull the packets out of the tunnel encapsulation, accelerate the packet data, and then put the packets back into the encapsulation.

At process block 910, the packet encapsulation tunnel protocol header may be removed from the packets and stored in a storage memory (process block 915). Once the packet has been "removed" from the tunneling, acceleration, shaping, compression, etc., are performed on the packet payload data (process block 920). In one embodiment, the packet may be stored in a hash table, which may be used to map each tunnel key to each packet.

Once acceleration and the like is performed, at process block 925, the tunnel header may be retrieved and replaced in the packet (process block 930). As such, the packet is able to continue being transmitted until the packet reaches its destination at the second endpoint (process block 935).

Figure 10:
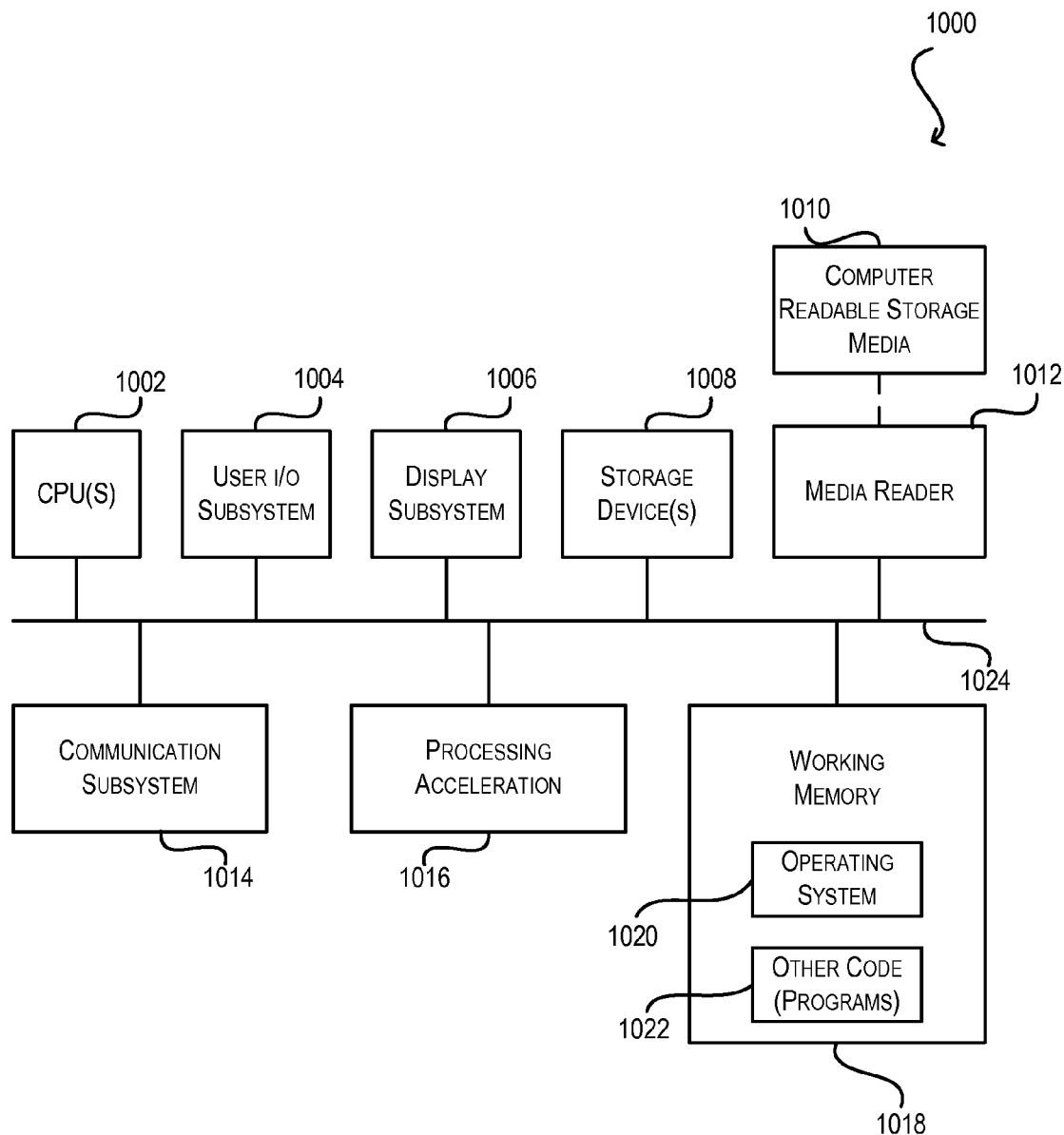
FIG. 10 is a simplified block diagram illustrating the physical components of a computer system that may be used in accordance with an embodiment of the present invention.

FIG. 10 is a simplified block diagram illustrating the physical components of a computer system 1000 that may be used in accordance with an embodiment of the present invention. This diagram is merely an example, which should not unduly limit the scope of the claims. One of ordinary skill in the art would recognize many variations, alternatives, and modifications.

In various embodiments, computer system 1000 may be used to implement any of the computing devices of the present invention. As shown in FIG. 10, computer system 1000 comprises hardware elements that may be electrically coupled via a bus 1024. The hardware elements may include one or more central processing units (CPUs) 1002, one or more input devices 1004 (e.g., a mouse, a keyboard, etc.), and one or more output devices 1006 (e.g., a display device, a printer, etc.). For example, the input devices 1004 are used to receive user inputs for procurement related search queries. Computer system 1000 may also include one or more storage devices 1008. By way of example, storage devices 1008 may include devices such as disk drives, optical storage devices, and solid-state storage devices such as a random access memory (RAM) and/or a read-only memory (ROM), which can be programmable, flash-updateable and/or the like. In an embodiment, various databases are stored in the storage devices 1008. For example, the central processing unit 1002 is configured to retrieve data from a database and process the data for displaying on a GUI.

Computer system 1000 may additionally include a computer-readable storage media reader 1012, a communications subsystem 1014 (e.g., a modem, a network card (wireless or wired), an infra-red communication device, etc.), and working memory 1018, which may include RAM and ROM devices as described above. In some embodiments, computer system 1000 may also include a processing acceleration unit 1016, which can include a digital signal processor (DSP), a special-purpose processor, and/or the like.

Computer-readable storage media reader 1012 can further be connected to a computer-readable storage medium 1010, together (and, optionally, in combination with storage devices 1008) comprehensively representing remote, local, fixed, and/or removable storage devices plus storage media for temporarily and/or more permanently containing computer-readable information. Communications system 1014 may permit data to be exchanged with network and/or any other computer.

Computer system 1000 may also comprise software elements, shown as being currently located within working memory 1018, including an operating system 1020 and/or other code 1022, such as an application program (which may be a client application, Web browser, mid-tier application, RDBMS, etc.). In a particular embodiment, working memory 1018 may include executable code and associated data structures for one or more of design-time or runtime components/services. It should be appreciated that alternative embodiments of computer system 1000 may have numerous variations from that described above. For example, customized hardware might also be used and/or particular elements might be implemented in hardware, software (including portable software, such as applets), or both. Further, connection to other computing devices such as network input/output devices may be employed. In various embodiments, the behavior of the view functions described throughout the present application is implemented as software elements of the computer system 1000.

In one set of embodiments, the techniques described herein may be implemented as program code executable by a computer system (such as a computer system 1000) and may be stored on machine-readable media. Machine-readable media may include any appropriate media known or used in the art, including storage media and communication media, such as (but not limited to) volatile and non-volatile, removable and non-removable media implemented in any method or technology for storage and/or transmission of information such as machine-readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store or transmit the desired information and which can be accessed by a computer.

While the principles of the disclosure have been described above in connection with specific apparatuses and methods, it is to be clearly understood that this description is made only by way of example and not as limitation on the scope of the disclosure. Further, while the invention has been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware and/or software configuration. Similarly, while various functionality is ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary features, the various components and/or features described herein with respect to a particular embodiment can be substituted, added and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A method of implementing acceleration through a packet encapsulation protocol tunnel between a satellite modem termination system (SMTS) and a network gateway, the method comprising:
   receiving, at an acceleration module in communication with the SMTS and the network gateway, a first packet through the packet encapsulation protocol tunnel, the first packet comprising a payload accelerated by a user terminal using an acceleration protocol and transmitted to the SMTS via satellite, the accelerated first packet encapsulated by the SMTS using a packet encapsulation protocol tunnel header;
   removing the packet encapsulation protocol tunnel header from the encapsulated first packet;
   storing the removed packet encapsulation protocol tunnel header;
   retrieving the payload from the acceleration protocol of the accelerated first packet;
   retrieving the stored packet encapsulation protocol tunnel header;
   re-encapsulating the payload in a second packet using the retrieved packet encapsulation protocol tunnel header; and
   sending the encapsulated second packet through the packet encapsulation protocol tunnel to the network gateway.

2. A method of implementing acceleration through a packet encapsulation protocol tunnel as in claim 1, wherein the packet encapsulation protocol comprises a Generic Routing Encapsulation (GRE) protocol or an IP in IP (IP-IP) protocol.

3. A method of implementing acceleration through a packet encapsulation protocol tunnel as in claim 1, further comprising performing prefetching at the acceleration module responsive to receiving the accelerated first packet.

4. A method of implementing acceleration through a packet encapsulation protocol tunnel as in claim 1, further comprising performing byte caching at the acceleration module responsive to receiving the accelerated first packet.

5. A method of implementing acceleration through a packet encapsulation protocol tunnel as in claim 1, wherein the retrieving the payload from the accelerated first packet comprises performing compression.

6. A method of implementing acceleration through a packet encapsulation protocol tunnel as in claim 1, wherein the packet encapsulation protocol tunnel header is preserved upon removal from the encapsulated accelerated first packet such that a packet source and a packet destination are traceable.

7. A method of implementing acceleration through a packet encapsulation protocol tunnel as in claim 1, wherein the packet encapsulation protocol tunnel headers are stored using a hash table.

8. A system for implementing acceleration through a packet encapsulation protocol tunnel, the system comprising:
   a customer premises device (CPE) configured to transmit a first packet to a destination, wherein the first packet includes a header and a payload;
   a user terminal (UT) in communication with the CPE, the UT configured to receive the first packet and transmit an accelerated packet via a satellite;
   a satellite modem termination system (SMTS) in communication with the satellite, the SMTS configured to receive the accelerated packet, establish a packet encapsulation protocol tunnel between the SMTS and a gateway module, and encapsulate the accelerated packet using a packet encapsulation protocol tunnel header; and
   a core node in communication with the SMTS, the core node including an acceleration module and the gateway module, the acceleration module configured to receive the encapsulated accelerated packet, remove the packet encapsulation protocol tunnel header, store the packet encapsulation protocol tunnel header retrieve the payload from the accelerated packet, retrieve the packet encapsulation protocol tunnel header re-encapsulate the payload in a second packet using the packet encapsulation protocol tunnel header, and transmit the encapsulated second packet to the gateway module, the gateway module configured to receive the encapsulated second packet, remove the packet encapsulation protocol tunnel header, and transmit the second packet to the destination.

9. A system for implementing acceleration through a packet encapsulation protocol tunnel as in claim 8, wherein the first packet comprises a web request.

10. A system for implementing acceleration through a packet encapsulation protocol tunnel as in claim 8, wherein the first packet comprises a request for web content.

11. A system for implementing acceleration through a packet encapsulation protocol tunnel as in claim 8, wherein the first packet header includes one or more of the following: a MAC portion, an IP portion, and a UDP portion.

12. A system for implementing acceleration through a packet encapsulation protocol tunnel as in claim 8, wherein the first packet comprises one or more of the following: a TCP request, a Mail request, an FTP request, an SMB request, and an RPC request.

13. A non-transitory computer-readable medium for implementing acceleration through a packet encapsulation protocol tunnel between a satellite modem termination system (SMTS) and a network gateway, having sets of instructions which, when executed by one or more computers, cause the one or more computers to:

receive, at an acceleration module in communication with the SMTS and the network gateway, a first packet through the packet encapsulation protocol tunnel, the first packet comprising a payload accelerated by a user terminal using an acceleration protocol and transmitted to the SMTS via satellite, the accelerated first packet encapsulated by the SMTS using a packet encapsulation protocol tunnel header;

remove the packet encapsulation protocol tunnel header from the encapsulated accelerated first packet;

store the removed packet encapsulation protocol tunnel header;

retrieve the payload from the acceleration protocol of the accelerated first packets;

retrieve the stored packet encapsulation protocol tunnel header;

re-encapsulate the payload in a second packet using the retrieved packet encapsulation protocol tunnel header; and send the encapsulated second packet through the packet encapsulation protocol tunnel to the network gateway.

14. A non-transitory computer readable medium as in claim 13, wherein the packet encapsulation protocol comprises a Generic Routing Encapsulation (GRE) protocol or an IP in IP (IP-IP) protocol.

15. A computer readable medium as in claim 13, further comprising instructions to cause the one or more computers to perform prefetching at the acceleration module responsive to receiving the accelerated first packet.

16. A computer readable medium as in claim 13, further comprising instructions to cause the one or more computers to perform byte caching at the acceleration module responsive to receiving the accelerated first packet.

\* \* \* \* \*